(12) United States Patent
Takahashi et al.

(10) Patent No.: US 8,384,765 B2
(45) Date of Patent: Feb. 26, 2013

(54) TRANSMITTER, RECEIVER, SIGNAL TRANSMISSION SYSTEM, AND SIGNAL TRANSMISSION METHOD

(75) Inventors: Shuichi Takahashi, Kanagawa (JP); Isao Ohashi, Kanagawa (JP); Takuya Ooi, Tokyo (JP); Kazunari Yoshifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 619 days.

(21) Appl. No.: 12/612,425

(22) Filed: Nov. 4, 2009

(65) Prior Publication Data
US 2010/0118120 A1 May 13, 2010

(30) Foreign Application Priority Data
Nov. 10, 2008 (JP) ................. P2008-288254

(51) Int. Cl.
*H04N 13/00* (2006.01)
(52) U.S. Cl. .......................... 348/43; 348/663
(58) Field of Classification Search .......... None
See application file for complete search history.

(56) References Cited

U.S. PATENT DOCUMENTS

| | | | | |
|---|---|---|---|---|
| 6,256,449 B1* | 7/2001 | Eto | ................. | 386/312 |
| 7,196,736 B2* | 3/2007 | Ogawa | ................. | 348/670 |
| 7,319,720 B2* | 1/2008 | Abrams, Jr. | ................. | 375/240.12 |
| 7,728,910 B2* | 6/2010 | Chang | ................. | 348/665 |
| 2002/0149702 A1* | 10/2002 | Satoh | ................. | 348/663 |
| 2004/0150745 A1* | 8/2004 | Aiba | ................. | 348/441 |
| 2010/0182406 A1* | 7/2010 | Benitez | ................. | 348/46 |

FOREIGN PATENT DOCUMENTS

| | | |
|---|---|---|
| JP | 2006-195018 | 7/2006 |
| JP | 2007166277 | 6/2007 |

OTHER PUBLICATIONS

Japanese Office Action issued on Jul. 28, 2010, for corresponding Japanese Patent Application JP 2008-288254.
Bit-Serial Digital Interface for High-Definition Television Systems, (SMPTE Standard 292M-1998).
Dual Link 292M Interface for 1920×1080 Picture Raster (SMPTE Standard 372M-2002).

* cited by examiner

*Primary Examiner* — Greg C Bengzon
(74) *Attorney, Agent, or Firm* — K&L Gates LLP

(57) ABSTRACT

A transmitter is provided. When a three-dimensional image signal including a two-dimensional image signal and depth information of the two-dimensional image signal is transmitted to a receiver using a two signal transmission lines, the three-dimensional image signal including the two-dimensional image signal and the depth information of the two-dimensional image signal is input. Also, signal separation of the two-dimensional image signal is performed. In addition, one signal-separated part of the two-dimensional image signal is transmitted to a first signal transmission line and the other signal-separated part of the two-dimensional image signal is combined with the depth information and then transmitted to a second signal transmission line.

10 Claims, 12 Drawing Sheets

TRANSMITTER, RECEIVER, SIGNAL TRANSMISSION SYSTEM, AND SIGNAL TRANSMISSION METHOD

CROSS REFERENCES TO RELATED APPLICATIONS

The present application claims priority to Japanese Priority Patent Application JP 2008-288254 filed in the Japan Patent Office on Nov. 10, 2008, the entire content of which is hereby incorporated by reference.

BACKGROUND

The present application relates to a transmitter, a receiver, a signal transmission system, a signal transmission method, which are applicable to a three-dimensional signal transmission system that employs a serial digital interface of a dual-link connection to transmit a two-dimensional image signal and depth information for representing a three-dimensional image. Specifically, when a three-dimensional image signal including a two-dimensional image signal and depth information of the two-dimensional image signal is transmitted to a receiver using a two signal transmission lines, signal separation of the two-dimensional image signal is performed, one signal-separated part of the two-dimensional image signal is transmitted to a first signal transmission line, and the other signal-separated part of the two-dimensional image signal is combined with the depth information and then transmitted to a second signal transmission line, one link of the serial digital interface of dual link connection can transmit the two-dimensional image signal S11 and the other link thereof can transmit the two-dimensional image signal and/or the depth information thereof.

In recent years, televisions have become thinner and the screens thereof have become finer and larger and, as a next paradigm shift, three-dimensional image representation has been intensively studied. As a display form of a three-dimensional image signal using binocular disparity, typically, there are two different display forms. A first form is to combine a two-dimensional original and the depth information thereof and a second form is to combine a two-dimensional image signal for left vision and a two-dimensional image signal for right vision.

In the first form, depth information is extracted from a two-dimensional image signal and signal processing in response to the extracted depth information is then carried out on the two-dimensional image signal to allow a viewer to recognize a three dimensional signal. In the second form, a parallax difference is previously provided between a two-dimensional image signal for left vision and a two-dimensional image signal for right vision to allow a viewer to perceive a depth corresponding to the parallax difference and recognize a displayed image as a three-dimensional image.

As a transmission method for two-dimensional image signal, the SDI (Serial Digital Interface) standard has been widely used for professional uses in the broadcast industry and so on. The SDI standard includes two different standards, one is the SD-SDI standard used for transmitting a video with a standard image quality and the other is the HD-SDI standard for transmitting a high definition image. In addition, the HD-SDI standard includes two different types, a single link connection and a dual link connection.

A signal transmission technology using a single-link connection interface is disclosed in Bit-Serial Digital Interface for High-Definition Television Systems (SMPTE STANDARD 292M-1998). According to this signal transmission technology, for example, it is possible to transmit a 10-bit image of YCbCr422 format with a horizontal resolution of 1920 pixels and a vertical resolution of 1080 lines at a rate of 30 frames per second in progressive form or at a rate of 60 fields per second in interlace form.

On the other hand, a signal transmission technology using a dual-link connection interface is disclosed in Dual Link 292M Interface for 1920×1080 Picture Raster (SMPTE STANDARD 372M-2002).

In this signal transmission technology, for example, it is possible to transmit a 10-bit image of YCbCr444 format with a horizontal resolution of 1920 pixels and a vertical resolution of 1080 lines at a rate of 60 fields per second in interlace form. Alternatively, it is possible to transmit a 10-bit image of RGB444 format with a horizontal resolution of 1920 pixels and a vertical resolution of 1080 lines at a rate of 60 fields per second in interlace form.

In relation to a typical technology for transmission of three-dimensional image signal, furthermore, a transmission method, a transmitting-side apparatus, a receiving-side apparatus for three-dimensional image information are disclosed in Japanese Unexamined Patent Application Publication No. 2007-166277, particularly in page 10 and FIG. 1 of this document. According to this transmission method for three-dimensional image information, when a three-dimensional image signal is transmitted from a transmitting-side apparatus to a receiving-side apparatus using an interface capable of transmitting digital signals, such as those of DVI, the interface is provided with a function of transmitting 8-bit image signals corresponding to the respective RGB colors and this interface is used for transmission of 6-bit signals of the respective RGB colors and 6-bit depth information thereof.

In the method disclosed in such a patent document, it is noted that the low 2 bits of each of RGB colors is assigned to the bits of depth information without changing a bit rate used for the transmission. Such configurations of transmitting-side and receiving-side apparatuses lead to the transmission of a three-dimensional image signal without changing the maximum number of representable colors of the original two-dimensional image.

According to the above patent document, even if the above three-dimensional image signal is received by the display apparatus which can only display a two-dimensional image signal, the low 2 bits of each of RGB colors are not recognized as depth information but only recognized as RGB information. Thus, a difference in color of unrecognized bits is hardly recognized by a viewer.

SUMMARY

In the typical transmission method for three-dimensional image signal, such as one disclosed in the above patent document, the low 2 bits of each of RGB colors is assigned to the bits of depth information, so that the gradient of display color will fall to one fourth. Specifically, in an image display apparatus that displays an image using only a two-dimensional image signal, differences in colors are hardly recognizable when receiving a three-dimensional image color. In this case however, it becomes conspicuous when the gradation of the two-dimensional image signal is finely represented.

In addition, in the case of using the SDI standard to transmit a high definition image, it is necessary to shoot, record, and reproduce an image while preventing an image from causing a decrease in image quality. Under the present circumstances, a decrease in gradient is not allowable even if small. Therefore, when a three-dimensional image is displayed in response to a three-dimensional image signal using fine gradation representation, any combination of the aforementioned documents without any modification may cause a decrease in gradient of a two-dimensional image signal. In this case, a decrease in image quality of the corresponding three-dimensional image may occur up to a user-recognizable level.

Therefore, there is a need for a transmitter, a receiver, a signal transmission system, and a signal transmission method, in which when a three-dimensional image signal including a two-dimensional image signal and depth information of the two-dimensional image signal is transmitted to a receiver, a related-art dual-link signal transmission line is used for transmission of the three-dimensional image signal without a decrease in gradient of the two-dimensional image signal.

According to an embodiment, there is provided a transmitter that performs the following functions: When a three-dimensional image signal including a two-dimensional image signal and depth information of the two-dimensional image signal is transmitted to a receiver using two signal transmission lines, the three-dimensional image signal including the two-dimensional image signal and the depth information of the two-dimensional image signal is input, signal separation of the two-dimensional image signal is performed, one signal-separated part of the two-dimensional image signal is transmitted to a first signal transmission line, and the other signal-separated part of the two-dimensional image signal is combined with the depth information and then transmitted to a second signal transmission line.

According to the above configuration of the transmitter according to the embodiment, when a three-dimensional image signal including a two-dimensional image signal and depth information of the two-dimensional image signal is transmitted to a receiver using a two signal transmission lines, for example, a signal separator carries out YC bit separation of the two-dimensional image signal in parallel-bit configuration. A first signal processor converts the two-dimensional image signal in parallel-bit configuration subjected to YC bit separation by the signal separator into a two-dimensional image signal in serial-bit configuration and outputs the two-dimensional image signal in serial-bit configuration to the first signal transmission line. A second signal processor combines the two-dimensional image signal in parallel-bit configuration and depth information in parallel-bit configuration after the YC bit separation together, and also converts them into the two-dimensional image signal and depth information in serial configuration, followed by outputting the converted signal to the second signal line. Thus, one link of the serial digital interface of dual link connection can transmit the two-dimensional image signal, and simultaneously the other link thereof can transmit the two-dimensional image signal and/or the depth information thereof.

According to an embodiment, there is provided a receiver that performs the following functions: When a three-dimensional image signal including a two-dimensional image signal and depth information of the two-dimensional image signal is received from a transmitter using two signal transmission lines, one signal-separated part of the two-dimensional image signal from a first signal-transmission line is received and the other of the two-dimensional image signal and depth information, which are combined together, are received from a second signal transmission line, the two-dimensional image signal and the depth information received from the second signal transmission line are separated from each other, the two-dimensional image signal received from the first signal transmission line and the two-dimensional image signal received from the second signal transmission line are combined together, and a three-dimensional signal including the combined second two-dimensional image signals and the separated depth information is output.

According to the above configuration of the transmitter according to the embodiment, when a three-dimensional image signal including a two-dimensional image signal and depth information of the two-dimensional image signal is received from a transmitter using two signal transmission lines, for example, the structural components of the transmitter function as follows: A phase adjuster adjusts a phase of the two-dimensional image signal in serial-bit configuration received from the first signal transmission line to a phase of the two-dimensional image signal and depth information in serial-bit configuration received from the second signal transmission line. Also, a first signal processor converts the two-dimensional image signal in serial-bit configuration from the first signal transmission line and phase-adjusted by the phase adjuster into a two-dimensional image signal in parallel-bit configuration. A second signal processor converts the two-dimensional image signal and depth information in serial-bit configuration from the second signal transmission line and phase-adjusted by the phase adjuster into a two-dimensional image signal and depth information in parallel-bit configuration. A signal synthesizer that performs YC bit synthesis between the two-dimensional image signal in parallel configuration output from the first signal processor and the second dimensional image signal in parallel-bit configuration output from the second signal processor. Thus, one link of the serial digital interface of dual link connection can receive the two-dimensional image signal, and simultaneously the other link thereof can receive the two-dimensional image signal S13 and/or the depth information thereof.

According to an embodiment, there is provided a signal transmission system that includes a transmitter, a receiver, and two signal transmission lines. In the transmitter, a three-dimensional image signal including a two-dimensional image signal and depth information of the two-dimensional image signal is input, signal separation of the two-dimensional image signal is performed, one signal-separated part of the two-dimensional image signal is transmitted to a first signal transmission line, and the other signal-separated part of the two-dimensional image signal is combined with the depth information and then transmitted to a second signal transmission line. In the receptor, one signal-separated part of the two-dimensional image signal from the first signal-transmission line is received and the other of the two-dimensional image signal and depth information, which are combined together, are received from the second signal transmission line. The two-dimensional image signal and the depth information received from the second signal transmission line are separated from each other. Furthermore, the two-dimensional image signal received from the first signal transmission line and the two-dimensional image signal received from the second signal transmission line are combined together. Subsequently, the three-dimensional signal including the combined second two-dimensional image signals and the separated depth information is output. The two signal transmission lines connect the transmitter and the receiver.

According to an embodiment, there is provided a signal transmission method that includes the steps of: allowing a system for transmitting a three-dimensional image signal to receive an input of a three-dimensional image signal including a two-dimensional image signal and depth information of the two-dimensional image signal and perform signal separation of the two-dimensional image signal; transmitting one signal-separated part of the two-dimensional image signal to a first signal transmission line and combining the other signal-separated part of the two-dimensional image signal with the depth information and then transmitted to a second signal transmission line; receiving one signal-separated part of the two-dimensional image signal from the first signal-transmission line and receiving the other of the two-dimensional image signal and depth information, which are combined together, from the second signal transmission line; separating the two-dimensional image signal and the depth information received from the second signal transmission line from each other; combining the two-dimensional image signal received from the first signal transmission line and the two-dimensional image signal received from the second signal transmission line; and outputting a three-dimensional image signal including the compounded two-dimensional image signal and the separated depth information.

According to the above configuration of the transmitter according to the embodiment, when a three-dimensional image signal including a two-dimensional image signal and depth information of the two-dimensional image signal is transmitted to a receiver using a two signal transmission systems. Also, signal separation of the two-dimensional image signal is performed. Here, one signal-separated part of the two-dimensional image signal is transmitted to a first signal transmission line and the other signal-separated part of the two-dimensional image signal is combined with the depth information and then transmitted to a second signal transmission line.

Such a configuration of the transmitter realizes that one link of the serial digital interface of dual link connection can transmit the two-dimensional image signal, and simultaneously the other link thereof can transmit the two-dimensional image signal and/or the depth information thereof.

Therefore, without a decrease in gradient of the two-dimensional image, any dual-link signal transmission line typically used in the art may be employed to transfer a three-dimensional image signal that contains a two-dimensional image signal and the depth information thereof. Furthermore, in an image display apparatus which can connect only one link and only display a two-dimensional image signal, it becomes possible to construct a system for transmitting a three-dimensional image signal, which is capable of receiving and displaying only the two-dimensional image signal, even in the case of receiving the three-dimensional signal.

In the above configuration of the receiver according to the embodiment, when a three-dimensional image signal including a two-dimensional image signal and depth information of the two-dimensional image signal is received using two signal transmission lines, the two-dimensional image signal and the depth information received from the second signal transmission line are separated from each other. In addition, the two-dimensional image signal received from the first signal transmission line and the two-dimensional image signal received from the second signal transmission line are combined together. Furthermore, a three-dimensional signal including the second two-dimensional image signals and the separated depth information after the synthesis is output.

Such a configuration of the transmitter realizes that one link of the serial digital interface of dual link connection can receive the two-dimensional image signal, and simultaneously the other link thereof can receive the two-dimensional image signal and/or the depth information thereof.

Consequently, without a decrease in gradient of the two-dimensional image, any dual-link signal transmission line typically used in the art may be employed to receive a three-dimensional image signal that contains a two-dimensional image signal and the depth information thereof. Furthermore, in an image display apparatus which can connect only one link and only display a two-dimensional image signal. It becomes possible to construct a system for transmitting a three-dimensional image signal, which is capable of receiving and displaying only the two-dimensional image signal, even in the case of receiving the three-dimensional signal.

Each of the signal transmission system and the signal transmission method according any embodiment has the following advantages: The transmitter and the receiver of the present embodiment can be employed when a three-dimensional image signal containing a two-dimensional image signal and the depth information thereof is transmitted.

Such a configuration of the transmitter realizes that one link of the serial digital interface of dual link connection can transmit the two-dimensional image signal, and simultaneously the other link thereof can transmit the two-dimensional image signal S13 and/or the depth information thereof.

Therefore, without a decrease in gradient of the two-dimensional image, any dual-link signal transmission line typically used in the art may be employed to transmit a three-dimensional image signal that contains a two-dimensional image signal and the depth information thereof. Furthermore, in an image display apparatus which can connect only one link and only display a two-dimensional image signal, it becomes possible to construct a system for transmitting a three-dimensional image signal, which is capable of receiving and displaying only the two-dimensional image signal, even in the case of receiving the three-dimensional signal.

Additional features and advantages are described herein, and will be apparent from the following Detailed Description and the figures.

BRIEF DESCRIPTION OF THE FIGURES

FIG. 3 is a diagram illustrating time charts of examples of serial signal transmission from the links La and Lb, where

FIG. 8 is a diagram illustrating time charts of examples of serial signal transmission from the links La and Lb, where

FIG. 12 is a diagram illustrating time charts of examples of serial signal transmission from the links La and Lb, where

DETAILED DESCRIPTION

The present application will be described hereinafter with reference to the accompanying drawings that respectively illustrate a transmitter, a receiver, a signal transmission system, and a signal transmission method according to an embodiment.

The embodiments will be described in the following order:
1. First Embodiment (First Transmitter, Receiver, and Transmission System for Three Dimensional Image Signal)
2. Second Embodiment (Second Transmitter, Receiver, and Transmission System for Three Dimensional Image Signal)
3. Third Embodiment (Third Transmitter, Receiver, and Transmission System for Three Dimensional Image Signal)

First Embodiment

First Transmission System for Three Dimensional Image Signal

Figure 1:
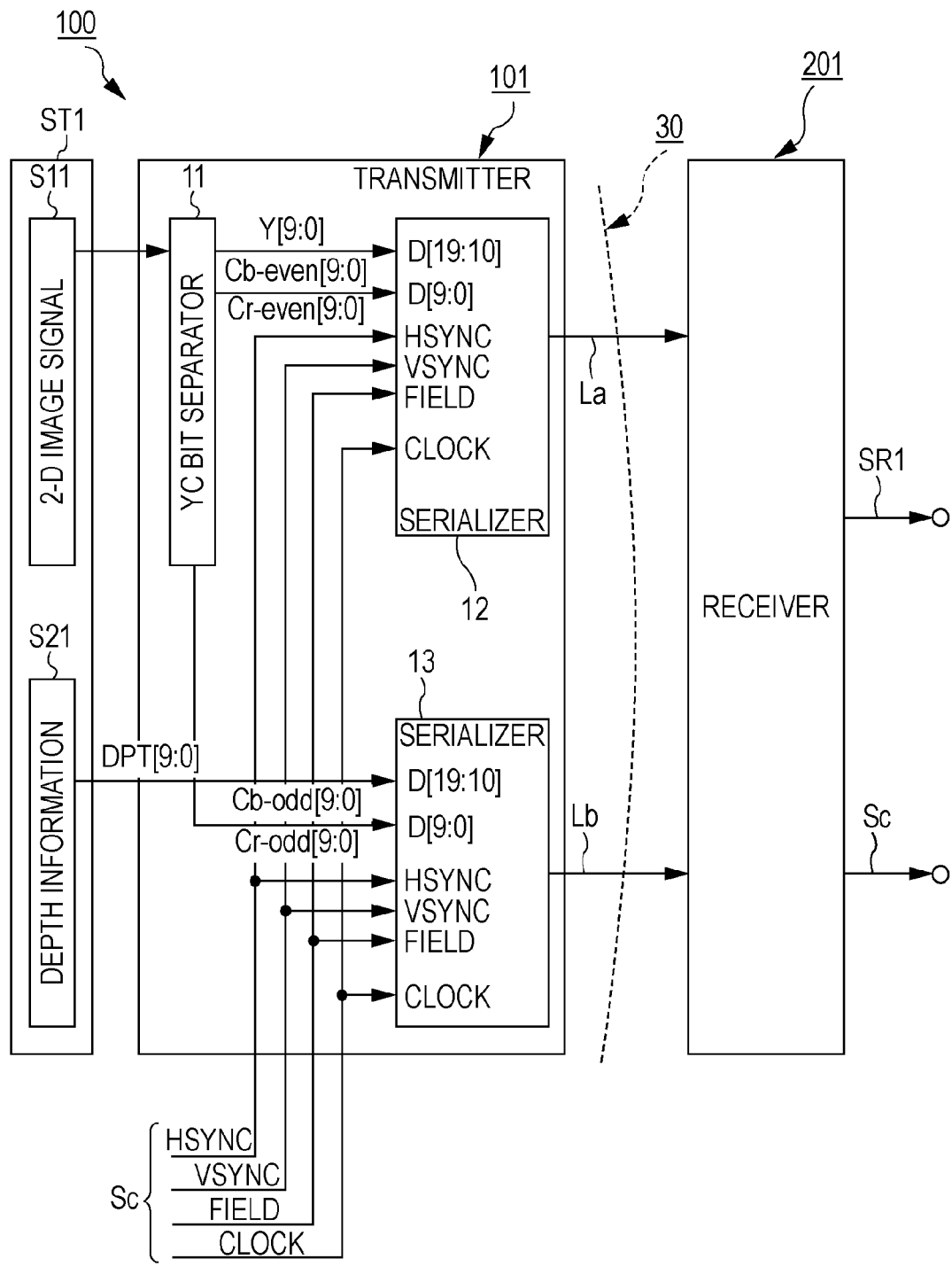
FIG. 1 is a block diagram illustrating the configuration of a transmitter in a transmission system for three-dimensional image signal 100 according to a first embodiment.
Figure 2:
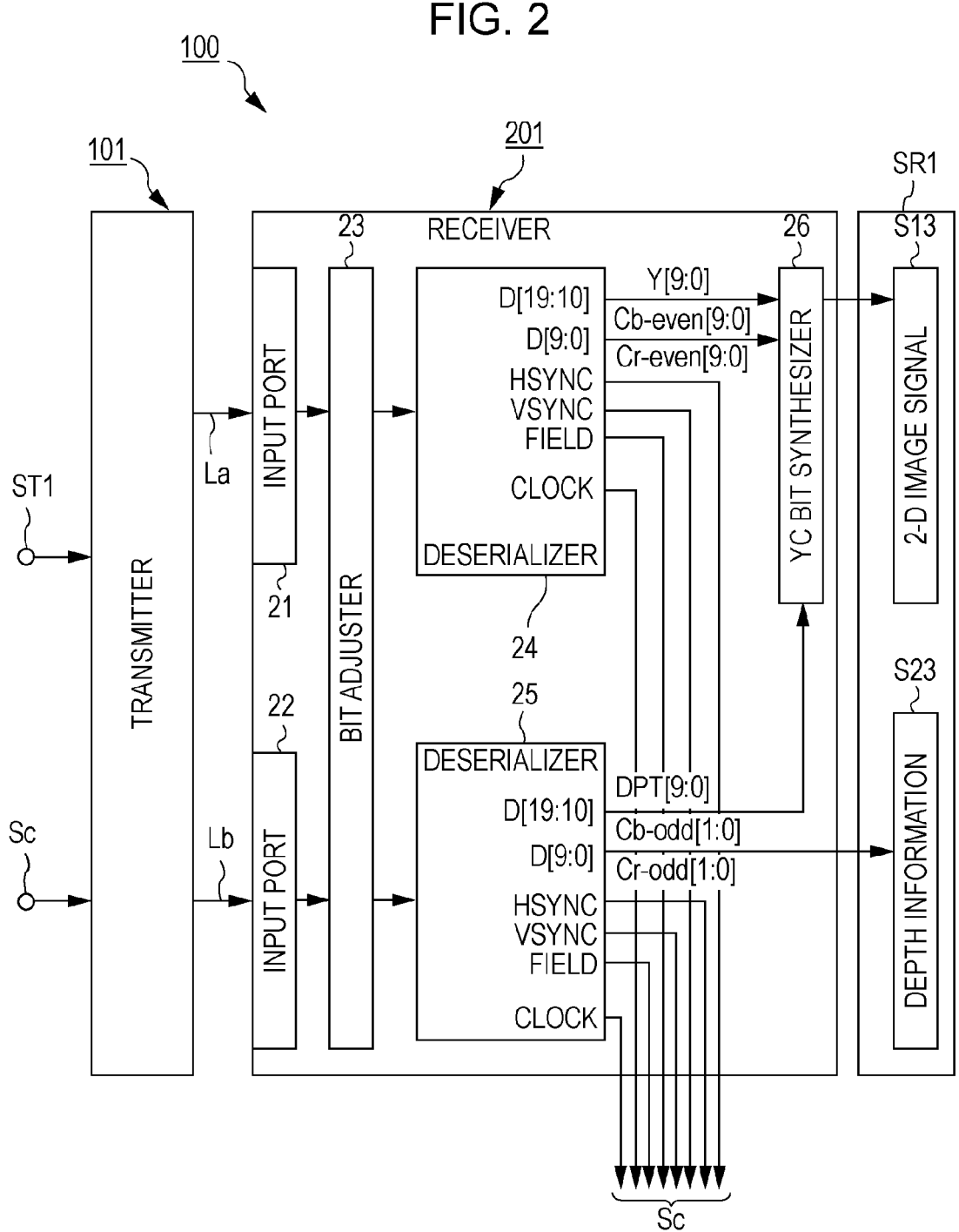
FIG. 2 a block diagram illustrating the configuration of a receiver in the transmission system for three dimensional image signal 100 according to the first embodiment.

FIG. 1 and FIG. 2 are block diagrams illustrating an exemplary configuration of a transmission system for three dimensional image signal 100 according to a first embodiment, where FIG. 1 illustrates the configuration of a transmitter and FIG. 2 illustrates the configuration of a receiver. In other words, the transmission system for three dimensional image signal 100 shown in FIG. 1 and FIG. 2 is an exemplary signal transmission line that transmits a three dimensional image signal for performing a process of displaying a three dimensional image, for example, from a recording/reproducing apparatus to an image display apparatus.

An exemplary configuration of the transmission system for three dimensional image signal (hereinafter, also simply referred to as a "transmission line") 100 includes a signal transmitting unit 30, a transmitter 101, and a receiver 201.

The transmitter 101 and the receiver 201 are connected by a signal transmitting unit 30 that constitutes an example of two signal transmission lines. That is, the signal transmitting unit 30 includes two lines of links La and Lb that constitute a dual-link signal transmission line. A luminance signal Y[9:0], a color-difference signal Cb[9:0], a color-difference signal Cr[9:0], and a signal DPT[9:0] of depth information (S23) (hereinafter, also referred to as a depth-information (S23) signal DPT[9:0]) are assigned to the link La and link Lb.

The transmitter 101 is installed in, for example, a signal output stage of a recording/reproducing apparatus (not shown) and includes a YC bit separator 11 and two serializers 12 and 13. To the receiver 201 connected to the two-line signal transmitting unit 30, the transmitter 101 transmits a three-dimensional image signal ST11 including a two-dimensional image signal of a YCbCr444-format and depth information S21 about the two-dimensional image signal S11.

The two-dimensional image signal S11 of the YCbCr444 format gives a 10-bit data format corresponding to an image display apparatus with a horizontal resolution of 1920 pixels and a vertical resolution of 1080 pixels

[Pixel Size: 1920×1080, Color Space: YCbCr444 10 bits, Image Format: 2-D image+Depth, Format Rate: 30, 29.97, 25, 24, 23.98 progressive and Psf,: 60, 59.94 50 fields Interlace].

The depth information S21 gives a 10-bit data format corresponding to an image display apparatus with a horizontal resolution of 1920 pixels and a vertical resolution of 1080 pixels.

The YC bit separator 11 is an exemplary signal separator and receives an input of a two-dimensional image signal S11 in parallel-bit configuration supplied from a recording/reproducing apparatus or the like (not shown) and then performs YC bit separation.

In this example, the numbers attached to the endings of the terms, for example, a luminance signal Y, a color-difference signal Cb, and a color-difference signal Cr, which constitute a two-dimensional image signal S11, and a signal DPT that constitutes depth information S21, represent the numbers of pixels in each line, respectively.

If a three-dimensional image signal ST1 is input into the transmitter 101, the YC bit separator 11 takes out each of signals from a two-dimensional image signal S11 in the three-dimensional image signal ST21. The signals include:
a luminance signal Y[9:0]; an even-pixel color-difference signal Cb-even[9:0]; an even-pixel color-difference signal Cr-even[9:0]; an odd-pixel color-difference signal Cb-odd[9:0]; and an odd-pixel color-difference signal Cr-odd[9:0].

The luminance signal Y[9:0], even-pixel color-difference signal Cb-even[9:0], and even-pixel color-difference signal Cr-even[9:0] taken out by the YC bit separator 11 are output to the serializer 12.

Each of the odd-pixel color-difference signal Cb-odd[9:0] and the odd-pixel color-difference signal Cr-odd[9:0] taken out by the YC bit separator 11 is output to the serializer 13.

In this example, the depth information S21 is taken out from the three-dimensional image signal ST1 and then input into the serializer 13. The depth information S21 is given by a signal DPT[9:0]. The signal DPT[9:0] of this depth information S21 (depth-information (S23) signal DPT[9:0]) is 10 bits in width and represented by a gray scale, for example, the most distal side is "0" and the most proximal side is "1023". A procedure for allowing the sender to extract the depth information S21 from the three-dimensional image signal ST1 is not typically relevant to any embodiment and may be any of typical procedures in the art.

Both the serializer 12 and the serializer 13 are connected to the YC bit separator 11. The serializer 12 is designed as an example of a first signal processor and converts a two-dimensional image signal S11 in parallel-bit configuration subjected to YC-bit separation by the YC bit separator 11 into a two-dimensional image signal S11 in serial-bit configuration, followed by outputting the signal to the link La. The serializer 12 is designed as a serial digital interface and an output terminal thereof is connected to the link La. In this example, the luminance signal Y[9:0], color-difference signal Cb[9:0], and color-difference signal Cr[9:0] are assigned to the link La and link Lb of the signal transmitting unit 30, respectively. The link La is assigned with the luminance signal Y[9:0], even-pixel color-difference signal Cb-even[9:0], and even-pixel color-difference signal Cr-even[9:0] of 0 to 1919 pixels with a horizontal resolution of 1920 pixels (see FIG. 3).

The serializer 13 is designed as an example of a second signal processor and converts a two-dimensional image signal S11 in parallel-bit configuration and depth information S21 in parallel-bit configuration after the YC separation into a two-dimensional image signal S11 in serial-bit configuration and depth information S21 in serial-bit configuration, followed by outputting the signals to the link Lb, respectively.

The serializer 13 is designed as a serial digital interface and the output terminal thereof is connected to the link Lb. The link Lb is assigned with the depth-information (S21) signal DPT[9:0], the odd-pixel color-difference signal Cb-odd[9:0], and the odd-pixel color-difference signal Cr-odd[9:0] (see FIG. 3).

Each of the serializer 12 and the serializer 13 combines the two-dimensional signal S11 and/or depth information S21 in serial-bit configuration with, for example, a control signal Sc for controlling an electronic apparatus, such as an image display apparatus, of a transmission destination. In this example, the control signal Sc may be any of a horizontal synchronizing signal (hereinafter, also referred to as a HSYNC signal), a vertical synchronizing signal (hereinafter, also referred to as a VSYNC signal), a field signal (hereinafter, also referred to as a FIELD signal), and a clock signal (hereinafter, also referred to as a CLOCK signal).

The control signal Sc is unrelated to any of elements that constitute the luminance signal Y and color-differences signals Cb and Cr of the three-dimensional image, the depth information S21, and so on, so that it will not be described hereinafter in detail. When the three-dimensional image signal ST1 is transmitted to the electronic apparatus, such as another recording/reproducing apparatus, or when an image for three-dimensional representation is displayed on the image display apparatus, the HSYNC signal, VSYNC signal, FIELD signal, and CLOCK signal are desired. In that case, these control signals Sc are superimposed on the three-dimensional image signal ST1.

In the above example, the HSYNC signal, VSYNC signal, FIELD signal, and CLOCK signal are serialized by the serializers 12 and 13, respectively, and then sent to the signal transmitting unit 30. The HSYNC signal, VSYNC signal, FIELD signal, and CLOCK signal are common in both the two-dimensional image signal S11 and the depth information S21. The signal transmitting unit 30 may be either of a wired system or a wireless system.

In this way, according to the configuration of the transmitter 101, when the three-dimensional image signal ST1 including the two-dimensional signal S11 and the depth information S21 of the two-dimensional signal S11 is transmitted to the receiver 201 connected to the signal transmitting unit 30 having two links La and Lb, one link La of the serial digital interface of dual link connection can transmit the two-dimensional image signal S11 and the other link Lb thereof can transmit the two-dimensional image signal S11 and/or the depth information S21 thereof.

The receiver 201 shown in FIG. 2 receives a three-dimensional image signal ST1, which includes a two-dimensional image signal S11 and the depth information S21 thereof, from a transmitter 101 connected to a signal transmitting unit 30 having two lines of links La and Lb. The receiver 201 is mounted, for example, on the signal input stage of an image display apparatus.

The receiver 201 includes input ports 21 and 22, a phase adjuster 23, deserializers 24 and 25, and a YC bit synthesizer 26. The three-dimensional image signal ST1 includes a two-dimensional image signal S11 and the depth information S21 of the two-dimensional image signal S11.

One end of the input port 21 is connected to the link La of the signal transmitting unit 30 and the other end thereof is connected to the phase adjuster 23, where one of two-dimensional image signals S11 subjected to YC bit separation is received from the link La. One end of the input port 22 is connected to the link Lb of the signal transmitting unit 30 and the other end thereof is connected to the phase adjuster 23, where the other of the two-dimensional image signals S11, which are combined together, and the depth information S21 thereof is received from the link Lb.

The phase adjuster 23 performs phase adjustment with respect to the two-dimensional image signal S11 in serial-bit configuration received from the link La and the two-dimensional image signal S11 in serial-bit configuration and the depth information S21 thereof received from the link Lb.

For example, the phase adjuster 23 cancels a phase shift generated in each signal on the link La and the link Lb.

One of methods for canceling the phase shift, as shown in FIG. 3 is to perform phase adjustment so as to, in which the link La and the link Lb detect a flag (data or signal) that represents the start of video signal transfer (Start of Active Video, hereinafter also referred to as "SAV") and a flag (data or signal) that represents the end of video signal transfer (End of Active Video, hereinafter also referred to as "EAV"), respectively, followed by adjusting the phase so that the patterns of the signals are synchronized. In a second method for canceling the phase sift, the boundary between the SAV flag and a flag that represents the state of transferring a video signal (Active Video, hereinafter also referred to as "AV") and the boundary between the AV flag and the EAV flag and phase adjustment is then performed to synchronize the signal patterns. The phase shift may be canceled using any of the methods.

The phase adjuster 23 is connected to deserializers 24 and 25. Serial signals from the link La and Lb subjected to the phase adjustment are output from the phase adjuster 23 to the deserializers 24 and 25, respectively. In this example, the phases of the respective signals are coincided with each other and the phase shift of bits is canceled. Thus, each of a luminance signal Y[9:0], an even-pixel color-difference signal Cb-even[9:0], an even-pixel color-difference signal Cr-even[9:0], a signal DPT[9:0], an odd-pixel color-difference signal Cb-odd[9:0], and an odd-pixel color-difference signal Cr-odd[9:0] is extracted from the serial signal.

The deserializer 24 is designed as an example of a first signal processor and converts a two-dimensional image signal S11 in serial configuration from the link La, which has been phase-adjusted by the phase adjuster 23, into a two-dimensional image signal S11 in parallel-bit configuration. For example, from a serial signal from the link La after the phase adjustment, the deserializer 24 extracts each of a luminance signal Y[9:0], an even-pixel color-difference signal Cb-even[9:0], and an even-pixel color-difference signal Cr-even[9:0]; and a HSYNC signal, a VSYNC signal, a FIELD signal, and a CLOCK signal and then decodes the extracted signals.

The deserializer 25 is designed as an example of a second signal processor and converts a two-dimensional image signal S11 in serial configuration from the link Lb, which has been phase-adjusted by the phase adjuster 23, and the depth information S21 thereof into a two-dimensional image signal S11 in parallel-bit configuration and the depth information S21 thereof. For example, from a serial signal from the link Lb after the phase adjustment, the deserializer 25 extracts each of a signal DPT[9:0], an odd-pixel color-difference signal Cb-odd[9:0], and an odd-pixel color-difference signal Cr-odd[9:0] and then decodes the extracted signals. A procedure for allowing the receiver 201 to extract the depth information S21 from the two-dimensional image signal S11 is not typically relevant to any embodiment and may be any of typical procedures in the art.

A YC bit synthesizer 26 is designed as an example of a signal compositing part and connected to both the deserializers 24 and 25. The YC bit synthesizer 26 performs YC bit synthesis of the two-dimensional image signal S11 in parallel-bit configuration output from the deserializer 24 and the two-dimensional image signal S11 in parallel-bit configuration output from the deserializer 25. For example, the YC bit synthesizer 26 performs bit synthesis of each of a luminance signal Y[9:0], an even-pixel color-difference signal Cb-even [9:0], an even-pixel color-difference signal Cr-even[9:0], an odd-pixel color-difference signal Cb-odd[9:0], and an odd-pixel color-difference signal Cr-odd[9:0] to decode the original luminance signal Y[9:0], color-difference signal Cb[9:0], and color-difference signal Cr[9:0].

In this way, the receiver 201 generates a two-dimensional signal S11 from the luminance signal Y[9:0], color-difference signal Cb[9:0], and color-difference signal Cr[9:0] and the depth information S21 thereof from the signal DPT[9:0]. Therefore, a three-dimensional image based on the three-dimensional image signal S21 can be displayed.

Figure 3A:
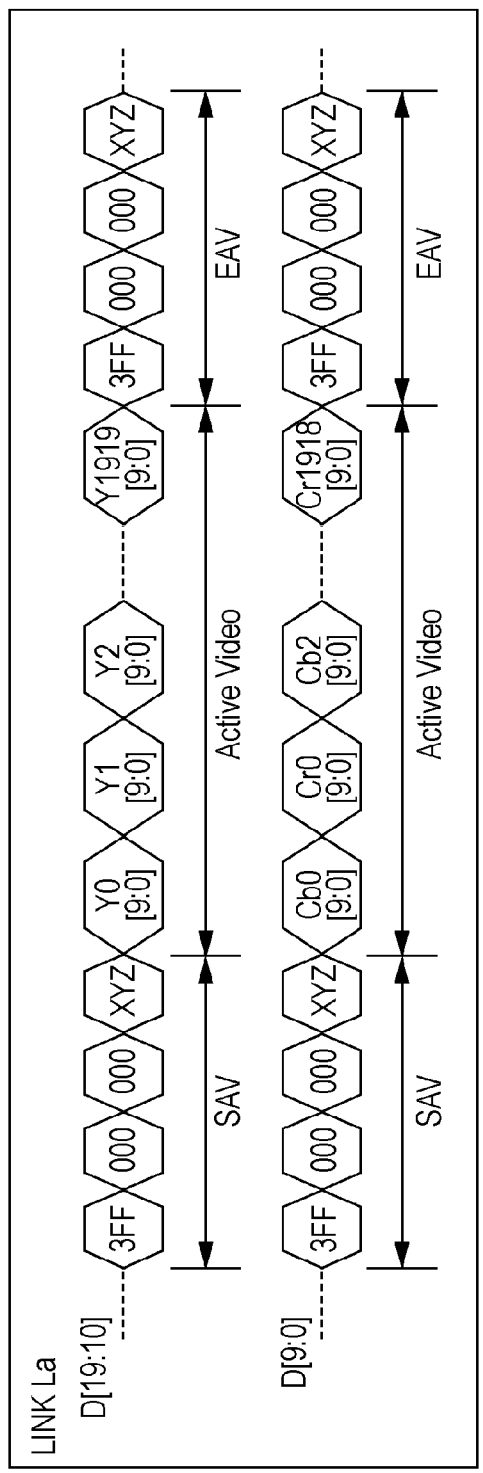
FIG. 3A is a time chart of an example of serial signal transmission from links La and FIG. 3B is a time chart for link Lb.
Figure 3B:
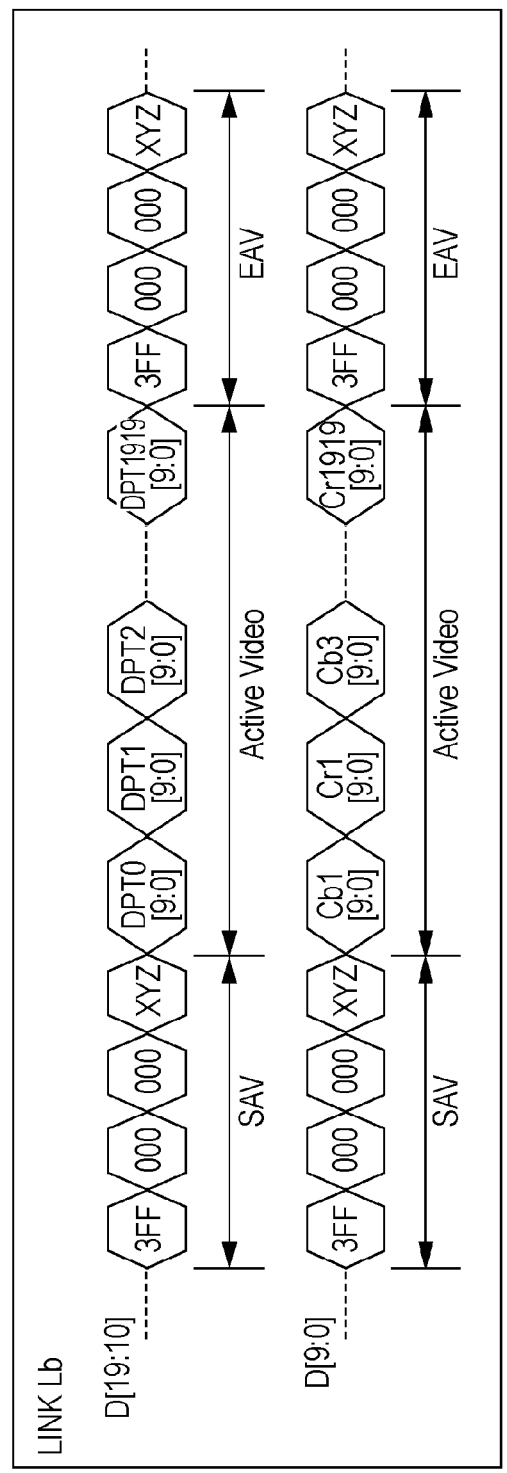

FIGS. 3A and 3B are time charts illustrating examples of serial signal transmission from the links La and Lb, respectively. In the diagram, a horizontal axis is a time and each hexagon on the horizontal axis represents a data packet. In this example, a three-dimensional image signal ST1 is represented by 20 bits (D[19:0]) and the link La of the signal transmitting unit 30 shown in FIG. 1 is assigned with a luminance signal Y[9:0], an even-pixel color-difference signal Cb-even[9:0], and an even-pixel color-difference signal Cr-even[9:0].

According to the link La shown in FIG. 3A, a fixed pattern (3FF 000 000 XYZ) is assigned as a SAV section to the high 10 bits (D[19:10]) of the serial signal.

The SAV section is followed by an AV section to which luminance signals Y0[9:0], Y1[9:0], Y2[9:0], ..., and Y1919 [9:0] are assigned as a video signal (two-dimensional image signal S11). Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. Following the SAV section, even-pixel color-difference signals Cb0[9:0], Cr0[9:0], Cb2[9:0], ..., and Cr1918[9:0] are assigned to an AV section.

Following the AV section, a fixed pattern (3FF 000 000 XYZ) is assigned to an EAV section.

An odd-pixel color-difference signal Cb-odd[9:0], an odd-pixel color-difference signal Cr-odd[9:0], and a signal DPT [9:0] of depth information S21 are assigned to the link Lb of the signal transmitting unit 30 shown in FIG. 1.

According to the link Lb shown in FIG. 3B, like the link La, a fixed pattern (3FF 000 000 XYZ) is assigned as a SAV section to the high 10 bits (D[19:10]) of the serial signal. The SAV section is followed by an AV section to which signals DPT0[9:0], DPT1[9:0], DPT2[9:0], ..., and DPT1919[9:0] are assigned as depth information S21.

Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. Following the SAV section, odd-pixel color-difference signals Cb1[9:0], Cr1[9:0], Cb3[9:0], ..., and Cr1919[9:0] are assigned to an AV section.

Following the AV section, a fixed pattern (3FF 000 000 XYZ) is assigned to an EAV section.

Therefore, the luminance signal Y[9:0], even-pixel color-difference signal Cb[9:0], and even-pixel color-difference signal Cr[9:0] can be transmitted from the transmitter 101 to the receiver 201 using the link La.

In addition, the odd-pixel color-difference signal Cb[9:0], odd-pixel color-difference signal Cr[9:0], and the depth-information (S21) signal DPT[9:0] can be transmitted from the transmitter 101 to the receiver 201 using the link Lb.

Then, an exemplary operation of a transmission system for three dimensional image signal 100 will be described with respect to the signal transmission method according to an embodiment.

Figure 4A:
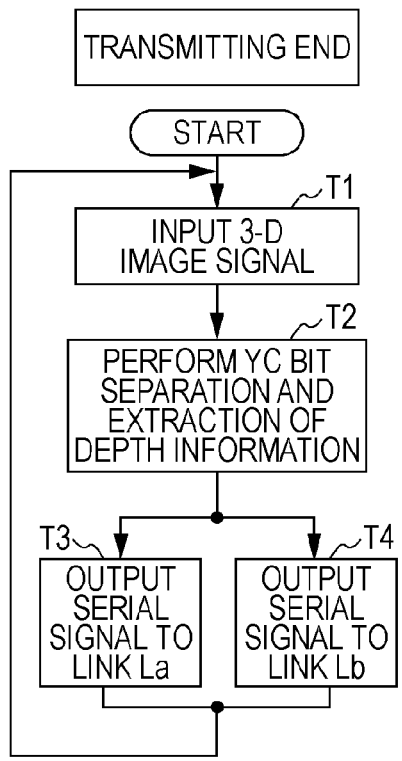
FIG. 4 is a flow chart illustrating the exemplary operation of the transmission system for three dimensional image signal 100.
Figure 4B:
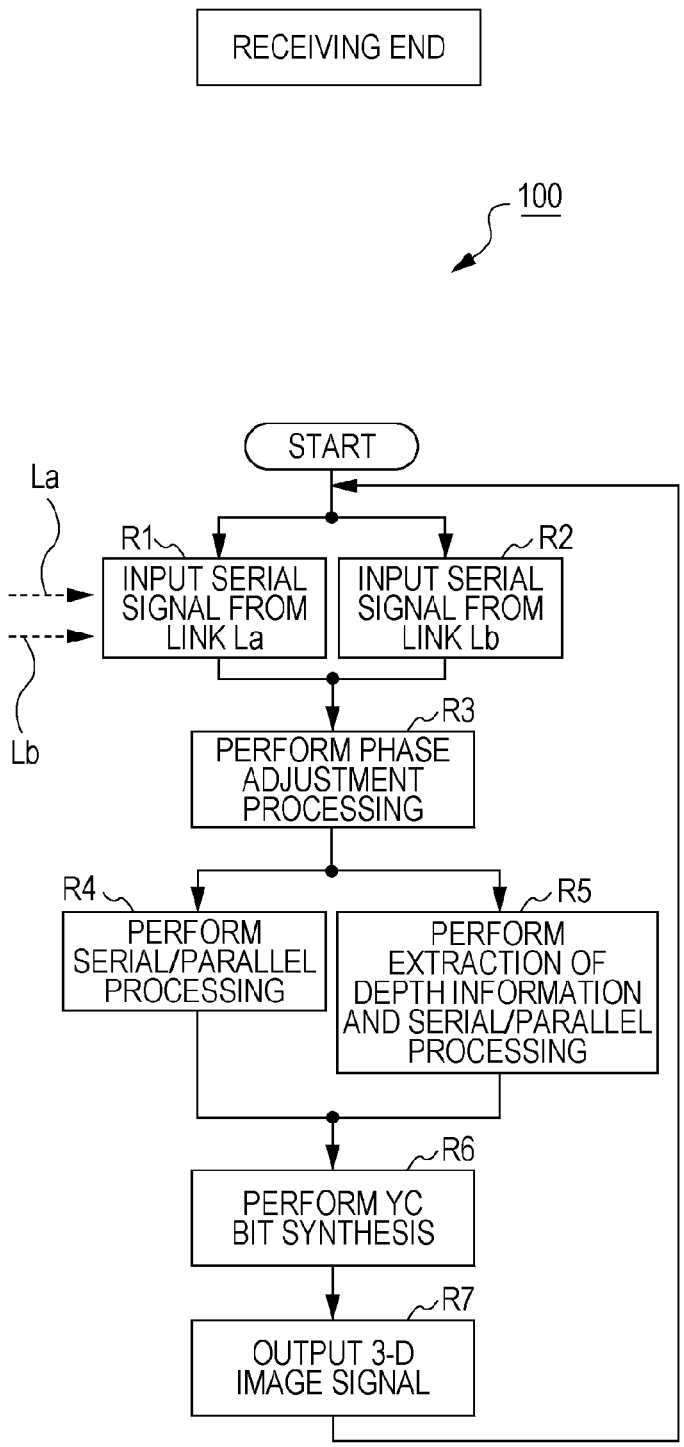

FIG. 4 is a flow chart illustrating the exemplary operation of the transmission system for three dimensional image signal 100. This example presupposes the following operation conditions: Depth information S21 is taken out from the three-dimensional image signal ST1 and then input into the serializer 13. The depth information S21 is given by a signal DPT [9:0]. Such a depth-information (S21) signal DPT[9:0] is of a 10-bit width. A luminance signal Y[9:0], an even-pixel color-difference signal Cb[9:0], and an even-pixel color-difference signal Cr[9:0] are transmitted from the transmitter 101 to the receiver 201 using the link La. In addition, the odd-pixel color-difference signal Cb[9:0], the odd-pixel color-difference signal Cr[9:0], and the depth-information (S21) signal DPT[9:0] are transmitted using the link Lb.

Under these operation conditions, in Step T1 of the flow chart shown in FIG. 4, the transmitter 101 inputs a three dimensional image signal ST1 that includes a two dimensional image signal S11 and the depth information S21 of the two dimensional image signal S11. The depth information S21 is taken out from the three-dimensional image signal ST1 and then input into the serializer 13.

Next, the transmitter 101 carries out signal separation of the two-dimensional image signal S11 in Step T2. At this time, the YC bit separator 11 carries out YC bit separation of the two-dimensional image signal S11 of a parallel-bit configuration. In this example, the YC bit separator 11 operates to take out each of signals from the two-dimensional image signal S11. The signals include:

a luminance signal Y[9:0], an even-pixel color-difference signal Cb-even[9:0], an even-pixel color-difference signal Cr-even[9:0], an odd-pixel color-difference signal Cb-odd[9:0], and an odd-pixel color-difference signal Cr-odd[9:0]. Each of the odd-pixel color-difference signal Cb-odd[9:0] and the odd-pixel color-difference signal Cr-odd[9:0] taken out by the YC bit separator 11 is output to the serializer 13.

The transmitter 101 transmits one of two-dimensional image signals S11 subjected to previous signal separation is received from the link La in Step T3. Simultaneously, the transmitter 101 combines the other two-dimensional image signal S11 subjected to the previous signal separation with depth information S21 and then transmits the multiplexed signal to the link Lb in Step T4. At this stem, in Step T3, the serializer 12 converts the two-dimensional image signal S11 in parallel-bit configuration subjected to YC-bit separation by the YC bit separator 11 into a two-dimensional image signal S11 in serial-bit configuration and then outputs the signal to the link La. According to "LINK LA" shown in FIG. 3A, the luminance signals Y0[9:0], Y1[9:0], Y2[9:0], ..., and Y1919 [9:0] in the AV section on the high 10 bits of the serial signal are transmitted as a two-dimensional image signal S11. The even-pixel color-difference signals Cb0[9:0], Cr0[9:0], and Cb2[9:0] ... Cr1918[9:0] in the AV section on the low 10 bits of the serial signal are transmitted.

In the above step T4, the serializer 13 combines a two-dimensional image signal S11 in parallel-bit configuration subjected to YC bit separation with depth information S21 in parallel-bit configuration, while converting a two-dimensional image signal S11 in serial-bit configuration with depth information S21 and outputting the signal to the link Lb. According to "Link LB" shown in FIG. 3B, signals DPT0[9:0], DPT1[9:0], DPT2[9:0], . . . , and DPT1919[9:0] in the AV section on the high 10 bits of the serial signal are transmitted as depth information S21. The odd-pixel color-difference signals Cb1[9:0], Cr1[9:0], and Cb3[9:0] . . . Cr1919[9:0] in the AV section on the low 10 bits of the serial signal are transmitted. The transmitter 101 repeats the above operation.

In response to the above operation of the transmitter 101, the link La of the signal transmitting unit 30 transmits a serial signal obtained by parallel-to-serial conversion of the luminance signal Y[9:0], the even-pixel color-difference signal Cb-even[9:0], the even-pixel color-difference signal Cr-even[9:0], a HSYNC signal, a VSYNC signal, a FIELD signal, and a CLOCK signal.

The link Lb transmits a serial signal obtained by parallel-to-serial conversion of each of the signal DPT[9:0], the odd-pixel color-difference signal Cb-odd[9:0], the odd-pixel color-difference signal Cr-odd[9:0], a HSYNC signal, a VSYNC signal, a FIELD signal, and a CLOCK signal respectively is transmitted. In other words, one link La of the serial digital interface of such a dual link connection can allow the receiver to receive the two-dimensional image signal S11. Simultaneously, the other link Lb thereof can allow the receiver to receive the two-dimensional image signal S11 and/or the depth information S21 thereof.

The receiver 201 receives one of two-dimensional image signals S11 subjected to signal separation from the link La in Step R1.

Simultaneously, the other of two-dimensional image signals S11 and the depth information S21 thereof, which are combined together, is received from the link Lb in Step R2.

Furthermore, in Step R3, the phase adjuster 23 adjusts the phase of the two-dimensional image signal S11 in serial-bit configuration received from the link La and the phase of the two-dimensional image signal S11 in serial-bit configuration and the depth information S21 thereof received from the link Lb through the input port 22.

For example, the phase adjuster 23 cancels a phase shift generated in each signal on the link La and the link Lb. In the phase adjuster 23, the SAV flag and the EAV flag, which have been described with reference to FIG. 3, are detected by the link La and the link Lb, respectively.

Based on this detection, the phases are adjusted so that that signal patterns may coincide with each other.

Alternatively, the phase adjuster 23 detects the boundary between the SAV flag and the AV flag and the boundary between the AV flag and the EAV flag and phase adjustment is then performed to synchronize the signal patterns.

The serial signal after phase adjustment is outputted to deserializers 24 and 25 from phase adjuster 23.

Then, receiver 201 carries out a serial-parallel-conversion process for the serial signal from link La at Step R4. In Step R5, on the other hand, the two-dimensional image signal S11 and the depth information S21 thereof received from the link Lb are separated.

In this example, the phases of the respective signals are coincided with one another and thus the bit phase shift phase is being canceled. Therefore, each of the luminance signal Y[9:0], even-pixel color-difference signal Cb-even[9:0], even-pixel color-difference signal Cr-even[9:0], signal DPT [9:0], odd-pixel color-difference signal Cb-odd[9:0], and odd-pixel color-difference signal Cr-odd[9:0] can be extracted from the serial signal.

For example, in the above step R4, the deserializer 24 converts a two-dimensional image signal S11 in serial configuration from the link La, which has been phase-adjusted by the phase adjuster 23, into a two-dimensional image signal S11 in parallel-bit configuration. At this time, from a serial signal from the link La after the phase adjustment, the deserializer 24 extracts each of a luminance signal Y[9:0], an even-pixel color-difference signal Cb-even[9:0], and an even-pixel color-difference signal Cr-even[9:0]; and a HSYNC signal, a VSYNC signal, a FIELD signal, and a CLOCK signal and then decodes the extracted signals.

On the other hand, in the above step R5, the deserializer 25 converts a two-dimensional image signal S11 in serial configuration from the link Lb, which has been phase-adjusted by the phase adjuster 23, and the depth information S21 thereof into a two-dimensional image signal S11 in parallel-bit configuration and the depth information S21 thereof. At this time, from a serial signal from the link Lb after the phase adjustment, the deserializer 25 extracts each of a signal DPT[9:0], an odd-pixel color-difference signal Cb-odd[9:0], and an odd-pixel color-difference signal Cr-odd[9:0], a HSYNC signal, a VSYNC signal, a FIELD signal, and a CLOCK signal and then decodes the extracted signals.

In Step SR6, the receiver 201 combines the two-dimensional image signal S11 received from the link La with the two-dimensional image signal S11 received from the link Lb. At this time, the YC bit synthesizer 26 performs YC bit synthesis of the two-dimensional image signal S11 in parallel-bit configuration output from the deserializer 24 and the two-dimensional image signal S11 in parallel-bit configuration output from the deserializer 25.

In the above example, the YC bit synthesizer 26 performs bit synthesis of each of a luminance signal Y[9:0], an even-pixel color-difference signal Cb-even[9:0], an even-pixel color-difference signal Cr-even[9:0], an odd-pixel color-difference signal Cb-odd[9:0], and an odd-pixel color-difference signal Cr-odd[9:0]. As a result, the original luminance signal Y[9:0], color-difference signal Cb[9:0], and color-difference signal Cr[9:0] are restored. In this way, the receiver 201 generates a two-dimensional image signal S11 from the luminance signal Y[9:0], color-difference signal Cb[9:0], and color-difference signal Cr[9:0], and also generates depth information S21 from the signal DPT[9:0].

Subsequently, in Step R7, the receiver 201 outputs a three-dimensional image signal SR1 that contains the two-dimensional image signal S11 after the synthesis and the depth information S21 after the separation. If the image display apparatus on which the receiver 201 is mounted is an apparatus for displaying a three dimensional image based on the three-dimensional image signal SR1, a user can view the three-dimensional image based on the three-dimensional image signal SR1 by receiving both the two-dimensional image signal S11 and the depth information S21.

Therefore, in the transmission system for three-dimensional image signal 100 and the signal transmission method according to the first embodiment of the present invention, the transmitter 101 and the receiver 201 of the present embodiment can be employed when a three-dimensional image signal ST1 containing a two-dimensional image signal S11 and the depth information S21 thereof is transmitted.

Thus, one link La of the serial digital interface of dual link connection can transmit the two-dimensional image signal S11, and simultaneously the other link Lb thereof can transmit the two-dimensional image signal S11 and/or the depth information S21 thereof.

Therefore, without a decrease in gradient of the two-dimensional image S11, any dual-link signal transmission line typically used in the art may be employed to transfer a three-dimensional image signal ST1 that contains a two-dimensional image signal S11 and the depth information S21 thereof.

Furthermore, in an image display apparatus which can connect only one link La and only display a two-dimensional image signal S11, it becomes possible to construct a system for transmitting the three-dimensional image signal ST1, which is capable of receiving and displaying only the luminance signal Y[9:0], even-pixel color-difference signal Cb-even[9:0], and even-pixel color-difference signal Cr-even[9:0] of the two-dimensional image signal S11, even in the case of receiving a three-dimensional signal ST1.

For example, when the receiver 201 includes only the input port 21 and can receive only a signal from the link La, the receiver 201 receives each of the luminance signal Y[9:0], even-pixel color-difference signal Cb-even[9:0], and even-pixel color-difference signal Cr-even[9:0], and these signals have 10-bit color information of YCbCr422 format.

Therefore, the user can now view a color image based on the 10-bit two two-dimensional image signal S11 of YCbCr422 format with a horizontal resolution of 1920 pixels and a vertical resolution of 1080 lines.

In this embodiment, the number of bits of the signal DPT is set to 10 bits. Alternatively, the bit width may be no more than necessary, so that the bit width will not limited to 10 bits. For example, if a sufficient bit number for the signal DPT is 8 bits, part of the bits may be used such that 8 bits on the MSB side of the high 10 bits D[19:10] of the link Lb may be used for assigning the depth information S21.

Second Embodiment

Second Transmission System for Three Dimensional Image Signal

Figure 5:
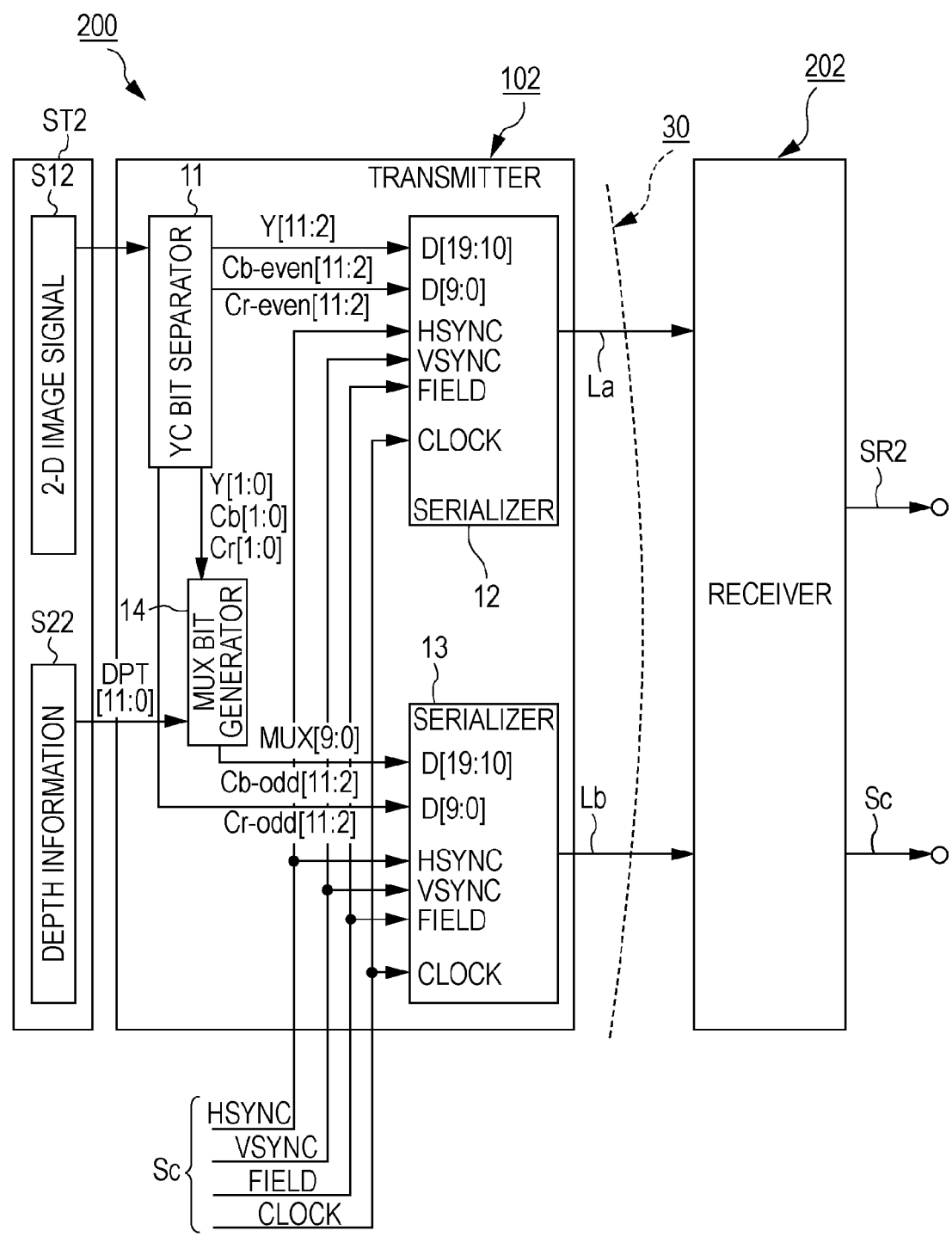
FIG. 5 is a block diagram illustrating the configuration of a transmitter in a transmission system for three dimensional image signal 200 according to a second embodiment.
Figure 6:
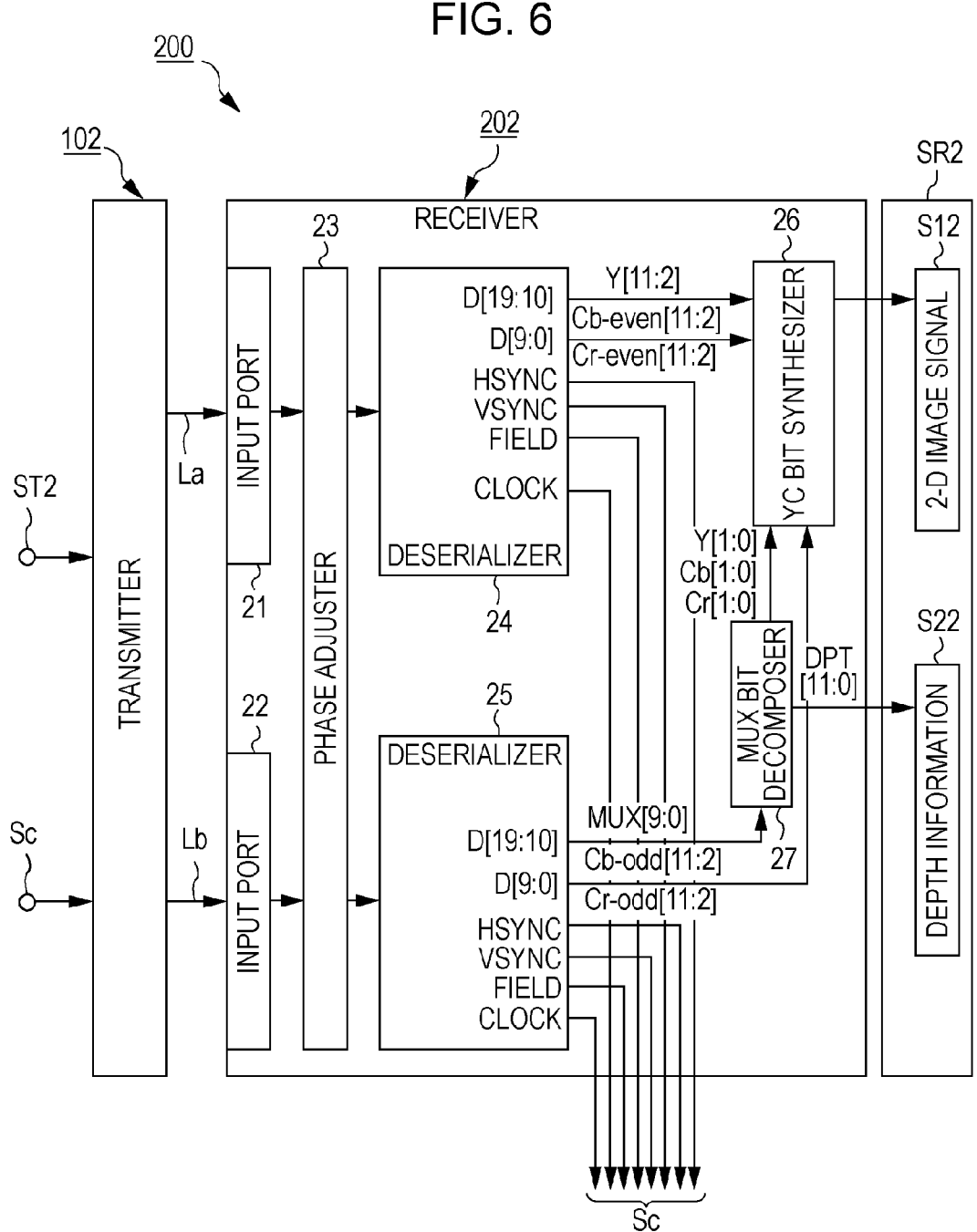
FIG. 6 is a block diagram illustrating the configuration of a receiver in a transmission system for three dimensional image signal 200 according to the second embodiment.

FIG. 5 is a block diagram illustrating the configuration of a transmitter in a transmission system for three dimensional image signal 200 according to a second embodiment of the present invention. FIG. 6 is a block diagram illustrating the configuration of a receiver in a transmission system for three dimensional image signal 200 according to a second embodiment of the present invention. The transmission system for three dimensional image signal 200 shown in FIGS. 5 and 6 constitutes an example of a signal transmission line, and transmits a three-dimensional image signal for performing a process of displaying a three-dimensional image display from a recording/reproducing apparatus or the like to an image display apparatus in a manner similar to that of the first embodiment.

The transmission system for three dimensional image signal 200 includes a signal transmitting unit 30, a transmitter 102, and a receiver 202. Both the transmitter 102 and the receiver 202 are connected by a signal transmitting unit 30 in a manner similar to that of the first embodiment. That is, the signal transmitting unit 30 includes two links La and Lb that constitute a dual-link signal transmission line. A luminance signal Y[11:0], a color-difference signal Cb[11:0], a color-difference signal Cr[11:0], and a signal DPT[11:0] of depth information (hereinafter, also referred to as a depth-information (S22) signal DPT[11:0]) are assigned to the link La and link Lb.

Like the first embodiment, the transmitter 102 is mounted on a signal output state of a recording/reproducing apparatus and includes a YC bit separator 11, serializers 12 and 13, and MUX bit generator 14. To the receiver 202 connected to the two-line signal transmitting unit 30, the transmitter 102 transmits a three-dimensional image signal ST2 including a two-dimensional image signal S12 of a YCbCr444-format and depth information S22 about the two-dimensional image signal S11.

The two-dimensional image signal S12 of the YCbCr444 format gives a 12-bit data format corresponding to an image display apparatus with a horizontal resolution of 1920 pixels and a vertical resolution of 1080 pixels [Pixel Size: 1920× 1080, Color Space: YCbCr444 12 bits, Image Format: 2D image+Depth, Format Rate: 30, 29.97, 25, 24, 23.98 progressive and Psf,: 60, 59.94 50 fields Interlace].

The depth information S22 gives a 12-bit data format corresponding to an image display apparatus with a horizontal resolution of 1920 pixels and a vertical resolution of 1080 pixels.

The YC bit separator 11 is an exemplary signal separator and receives an input of a two-dimensional image signal S12 in parallel-bit configuration supplied from a recording/reproducing apparatus or the like (not shown) and then performs YC bit separation. In this example, the numbers attached to the endings of the terms, luminance signal Y that constitutes the two-dimensional image signal S12 or the like, color-difference signal Cb and color-difference signal Cr, and signal DPT that constitutes depth information S22, represent the numbers of pixels in each line, respectively.

If the three-dimensional image signal ST2 is input into the transmitter 102, the YC bit separator 11 operates to take out each of signals from the two-dimensional image signal S12. The signals include: a luminance signal Y[11:2], an even-pixel color-difference signal Cb-even[11:2], and even-pixel color-difference signal Cr-even[11:2], an odd-pixel color-difference signal Cb-odd[11:2], an odd-pixel color-difference signal Cr-odd[11:2], a luminance signal Y[1:0], color-difference signals Cb[1:0], color-difference signals Cr[1:0], and color difference signals Cb[1:0] for even pixels and odd pixels.

The luminance signal Y[11:2], even-pixel color-difference signal Cb-even[11:2], and even-pixel color-difference signal Cr-even[11:2] taken out by the YC bit separator 11 are output to the serializer 12. The odd-pixel color-difference signal Cb-odd[11:2] and the odd-pixel color-difference signal Cr-odd[11:2], which were taken out by YC bit separator 11, are output to the serializer 13.

The luminance signal Y[1:0], even and odd pixels of the respective color-difference signals Cb[1:0], and even and odd pixels of the respective color-difference signals Cr[1:0] taken out by the YC bit separator 11 is output to the MUX bit generator 14.

The MUX bit generator 14 is an example of a bit generation part and designed to combine a two-dimensional image signal S12 in parallel-bit configuration subjected to YC bit separation by the YC bit separator 11 with the depth information S22 of the two-dimensional image signal S12.

Figure 8A:
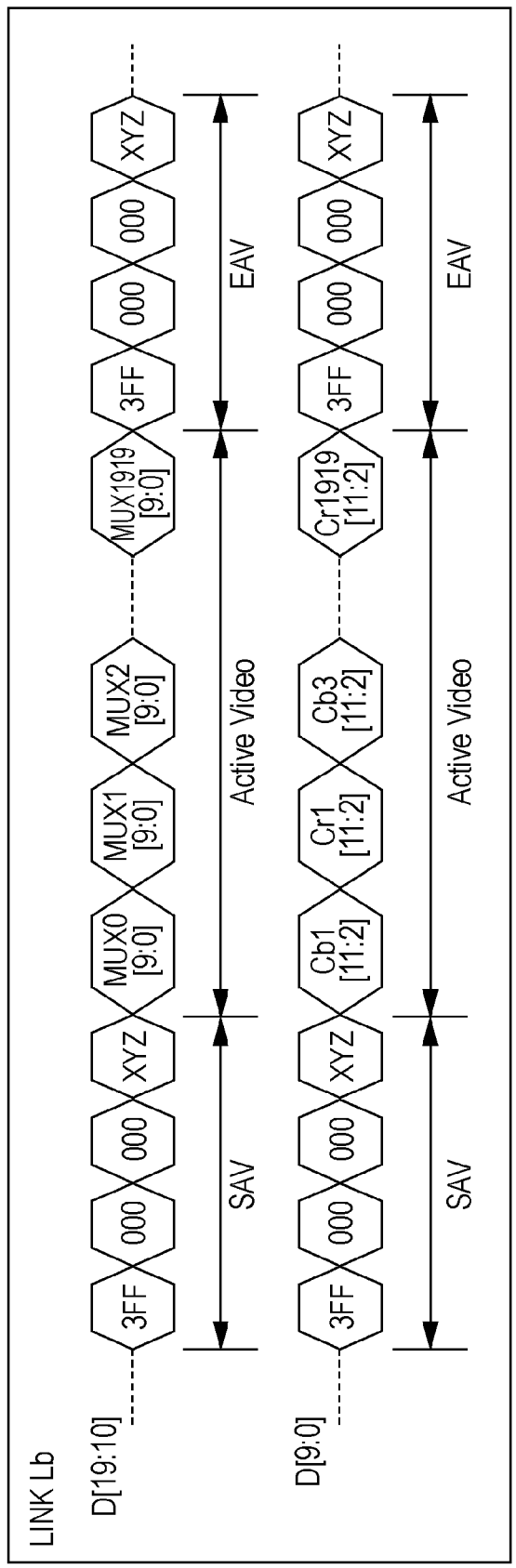
FIG. 8A is a time chart illustrating an example of serial signal transmission in the link Lb of the transmission system for three-dimensional image signal 200 (second example) and FIG. 8B is a time chart illustrating an example of serial signal transmission of MUX[9:0] (first example)
Figure 8B:
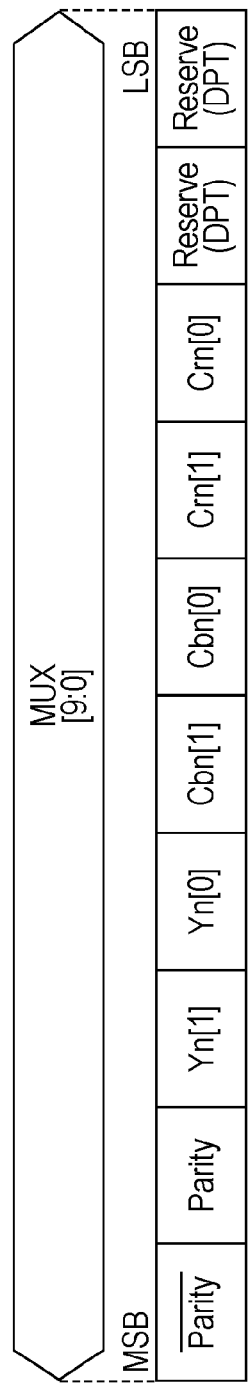

The MUX bit generator 14 is provided with a multi-bit MUX[9:0] in which a reserve region ("Reserve") is formed (see FIG. 8B).

In this example, the depth information S22 is taken out from the three-dimensional image signal ST2 and then input into the serializer 13 together with the odd-pixel color-difference signal Cb-odd[11:2] and the odd-pixel color-difference signal Cr-odd[11:2]. The depth information S22 is given by a signal DPT[11:0]. Such a depth-information (S22) signal DPT[11:0] is of a 12-bit width, for example, the most distal side is "0" and the most proximal side is "4096". A procedure for allowing the sender to extract the depth information S22 from the three-dimensional image signal ST2 is not typically relevant to any embodiment of the present invention and may be any of typical procedures in the art.

Both the serializer 12 and the serializer 13 are connected to the YC bit separator 11. The serializer 12 converts the two-dimensional image signal S12 in parallel-bit configuration subjected to YC-bit separation by the YC bit separator 11 into a two-dimensional image signal S12 in serial-bit configuration and then outputs the signal to the link La. The serializer 12 is designed as a serial digital interface and an output terminal thereof is connected to the link La. In this example, the luminance signal Y[11:2], color-difference signal Cb[11:2], and color-difference signal Cr[11:2] are assigned to the link La and link Lb of the signal transmitting unit 30, respectively (see FIG. 7).

The serializer 13 combines a two-dimensional image signal S12 in parallel-bit configuration subjected to YC bit separation with depth information S22 in parallel-bit configuration, while converting a two-dimensional image signal S12 in serial-bit configuration with depth information S22 and outputting the signal to the link Lb. The serializer 13 is designed as a serial digital interface and an output terminal thereof is connected to the link La.

Figure 7:
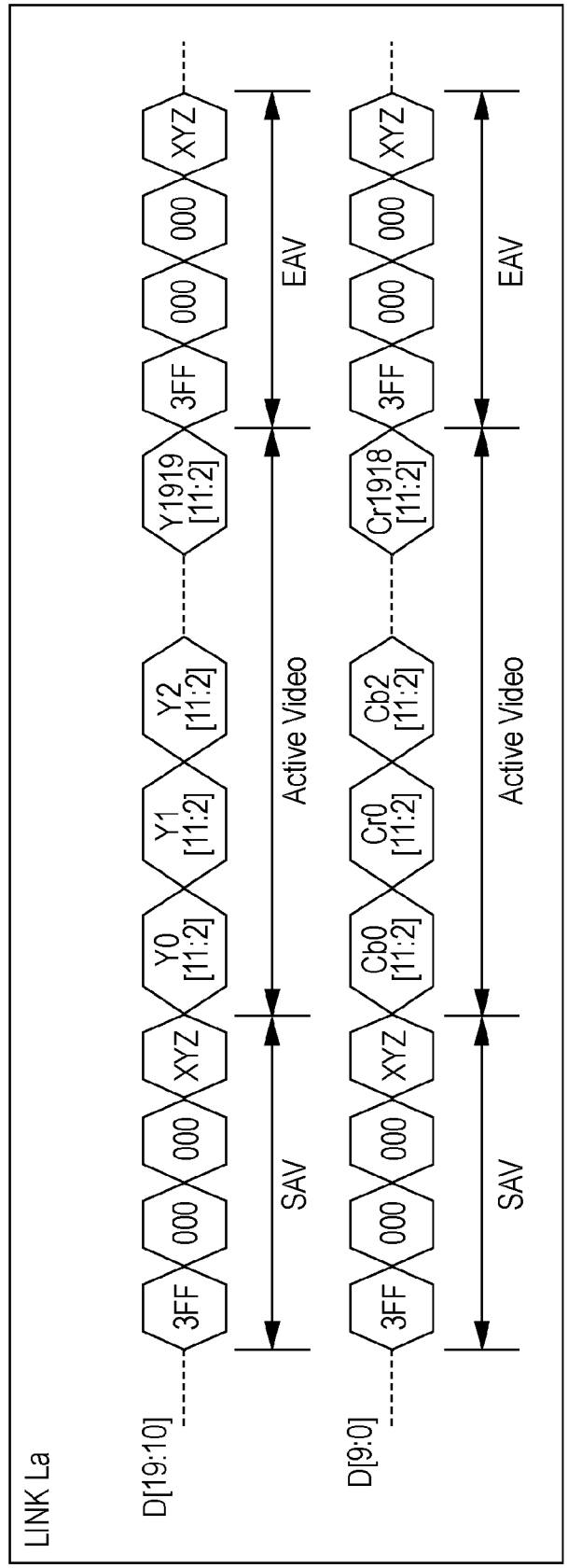
FIG. 7 is a time chart illustrating an example of serial signal transmission in the link La of the transmission system for three-dimensional image signal 200 (first example)

The signal DPT[11:0] of the depth information S21 is assigned to the link Lb (see FIG. 7).

Each of the serializer 12 and the serializer 13 combines the two-dimensional signal S12 and/or depth information S22 in serial-bit configuration with, for example, a control signal Sc for controlling an electronic apparatus, such as an image display apparatus, of a transmission destination. Also in this example, control signals Sc, such as an HSYNC signal, a VSYNC signal, a FIELD signal, and a CLOCK signal, are superimposed. The HSYNC signal, VSYNC signal, FIELD signal, and CLOCK signal are common in both the two-dimensional image signal S12 and the depth information S22. The signal transmitting unit 30 may be either of a wired system or a wireless system.

In this way, according to the configuration of the transmitter 102, when the three-dimensional image signal ST2 including the two-dimensional signal S12 and the depth information S22 of the two-dimensional signal S12 is transmitted to the receiver 202 connected to the signal transmitting unit 30 having two links La and Lb, one link La of the serial digital interface of dual link connection can transmit the two-dimensional image signal S12 and the other link Lb thereof can transmit the two-dimensional image signal S12 and/or the depth information S22 thereof.

In this example, the link La of the signal transmitting unit 30 transmits a serial signal obtained by serializing each of the luminance signal Y[11:2], even-pixel color difference signal Cb-even[11:2], and even-pixel color difference signal Cr-even[11:2], a HSYNC signal, a VSYNC signal, a FIELD signal, and a CLOCK signal. The link Lb transmits a serial signal obtained by serializing each of the multi-bit MUX[11:2], odd-pixel color difference signal Cb-odd[11:2], and odd-pixel color difference signal Cr-odd[11:2], a HSYNC signal, a VSYNC signal, a FIELD signal, and a CLOCK signal.

The receiver 202 shown in FIG. 6 receives a three-dimensional image signal ST2 including a two-dimensional image signal S12 and the depth information S22 of the two-dimensional image signal S12 from the transmitter 102 connected to the signal-transmitting unit 30 having two links La and Lb. The receiver 202 includes input ports 21 and 22, a phase adjuster 23, deserializers 24 and 25, a YC bit synthesizer 26, and a MUX bit decomposer 27. The three-dimensional image signal ST2 includes a two-dimensional image signal S12 and the depth information S22 of the two-dimensional image signal S12.

One end of the input port 21 is connected to the link La of the signal transmitting unit 30 and the other end thereof is connected to the phase adjuster 23, where one of two-dimensional image signals S12 subjected to YC bit separation is received from the link La. One end of the input port 22 is connected to the link Lb of the signal transmitting unit 30 and the other end thereof is connected to the phase adjuster 23, where the other of the two-dimensional image signals S12, which are combined together, and the depth information S22 thereof is received from the link Lb.

The phase adjuster 23 performs phase adjustment with respect to the two-dimensional image signal S12 in serial-bit configuration received from the link La and the two-dimensional image signal in serial-bit configuration and the depth information S22 thereof received from the link Lb. For example, the phase adjuster 23 cancels a phase shift generated in each signal on the link La and the link Lb. The details of the method for canceling the phase shift is the same as one described in the first embodiment.

The phase adjuster 23 is connected to deserializers 24 and 25. Serial signals from the link La and Lb subjected to the phase adjustment are output from the phase adjuster 23 to the deserializers 24 and 25, respectively. In this example, the phases of the respective signals are coincided with each other and the phase shift of bits is canceled. Therefore, each of the luminance signal Y[11:2], even-pixel color-difference signal Cb-even[11:2], even-pixel color-difference signal Cr-even[11:2], signal DPT[11:0] of the depth information S22, odd-pixel color-difference signal Cb-odd[11:2], and odd-pixel color-difference signal Cr-odd[11:2] can be extracted from the serial signal.

The deserializer 24 converts a two-dimensional image signal S12 in serial configuration from the link La, which has been phase-adjusted by the phase adjuster 23, into a two-dimensional image signal S12 in parallel-bit configuration. For example, from a serial signal from the link La after the phase adjustment, the deserializer 24 extracts each of a luminance signal Y[11:2], an even-pixel color-difference signal Cb-even[11:2], and an even-pixel color-difference signal Cr-even[11:2]; and a HSYNC signal, a VSYNC signal, a FIELD signal, and a CLOCK signal and then decodes the extracted signals.

The deserializer 25 is desired as an example of a second signal processor and converts a two-dimensional image signal S12 in serial configuration from the link Lb, which has been phase-adjusted by the phase adjuster 23, and the depth information S22 thereof into a two-dimensional image signal S12 in parallel-bit configuration and the depth information S22 thereof.

For example, from a serial signal from the link Lb after the phase adjustment, the deserializer 25 extracts each of a multi-bit MUX[9:0], an odd-pixel color-difference signal Cb-odd[11:2], and an odd-pixel color-difference signal Cr-odd[11:2]; and a HSYNC signal, a VSYNC signal, a FIELD signal, and a CLOCK signal and then decodes the extracted signals. A procedure for allowing the receiver 202 to extract the depth information S22 from the two-dimensional image signal S12 is not typically relevant to any embodiment of the present invention and may be any of typical procedures in the art.

The deserializer 25 is connected to a MUX bit decomposer 27 designed as an example of a bit decomposer.

Therefore, the two-dimensional image signal S12 and the depth information S22 thereof which are combined in parallel and output from the deserializer 25 can be subjected to signal decomposition. For example, the MUX bit decomposer 27 decomposes the serial signal of MUX[9:0]. From the decomposed serial signals, parity bits, a luminance signal Y[1:0], even and odd pixels of the respective color-difference signals Cb[1:0], even and odd pixels of the respective color-difference signals Cr[1:0], and bits of depth information S22 are extracted.

A YC bit synthesizer 26 is designed as an example of a signal compositing part and connected to both the deserializer 24 and the MUX bit decomposer 27. The YC bit synthesizer 26 performs YC bit synthesis of two-dimensional image signal S12 in parallel-bit configuration output from the deserializer 24 and the two-dimensional image signal S12 in parallel-bit configuration output from the MUX bit decomposer 27. For example, the YC bit synthesizer 26 carries out bit synthesis of each of a luminance signal Y[11:2], an even-pixel color-difference signal Cb-even[11:2], an even-pixel color-difference signal Cr-even[11:2], an odd-pixel color-difference signal Cb-odd[11:2]; and an odd-pixel color-difference signal Cr-odd[11:2]; and a luminance signal Y[1:0], an even and odd pixels of the respective color-difference signals Cb[1:0], and even and odd pixels of the respective color-difference signals Cr[1:0]. Then, the original luminance signal Y[11:0], color-difference signal Cb[11:0], and color-difference signal Cr[11:0] can be restored.

As a result of the restoration, a two-dimensional signal S12 is generated from the luminance signal Y[11:0], color-difference signal Cb[11:0], and color-difference signal Cr[11:0] and depth information S22 is generated from the signal DPT [11:0]. Therefore, a three-dimensional image based on the three-dimensional image signal SR2 can be displayed. When the receiver 202 can display a three-dimensional image signal SR2, a user can view the three-dimensional image based on the three-dimensional image signal S12 by receiving both the two-dimensional image signal S12 and the depth information S22.

FIG. 7, FIG. 8A, and FIG. 8B are time charts illustrating first and second examples of serial signal transmission from the links La and Lb of the three-dimensional signal transmission system 200, respectively.

In the diagram, a horizontal axis is a time and each hexagon on the horizontal axis represents a data packet. Also in this example, a three-dimensional image signal ST2 is represented by 20 bits (D[19:0]) and the link La of the signal transmitting unit 30 shown in FIG. 5 and FIG. 6 is assigned with a luminance signal Y[11:2], an even-pixel color-difference signal Cb-even[11:2], and an even-pixel color-difference signal Cr-even[11:2].

According to the link La shown in FIG. 7, a fixed pattern (3FF 000 000 XYZ) is assigned as a SAV section to the high 10 bits (D[19:10]) of the serial signal. The SAV section is followed by an AV section to which luminance signals Y0[11: 2], Y1[11:2], Y2[11:2], . . . , and Y1919[9:0] are assigned. Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. Following the SAV section, even-pixel color-difference signals Cb0[11:2], Cr0[11:2], Cb2[11:2], . . . , and Cr1918[11:2] are assigned to an AV section. Following the AV section, a fixed pattern (3FF 000 000 XYZ) is assigned to an EAV section.

To the link Lb of the signal-transmitting unit 30 shown in FIG. 5 and FIG. 6, an odd-pixel color-difference signal Cb[11:2], an odd-pixel color-difference signal Cr[11:2], a luminance signal Y[1:0], an even and odd pixels of the respective color-difference signals Cb[1:0], even and odd pixels of the respective color-difference signals Cr[1:0], and a signal DPT[11:0] of depth information S22 are assigned.

According to the link Lb shown in FIG. 8A, like the link La, a fixed pattern (3FF 000 000 XYZ) is assigned as a SAV section to the high 10 bits (D[19:10]) of the serial signal. Here, if multi-bit is set to MUX[9:0], the SAV section is followed by an AV section to which the multi-bit MUX0[9:0], MUX1[9:0], and MUX2[9:0], . . . , MUX1919[9:0] are assigned for luminance signal Y, color-difference signal Cb, color-difference signal Cr, and depth information S22. Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. Following the SAV section, odd-pixel color-difference signals Cb1[11:2], Cr1[11:2], Cb3[11:2], . . . , and Cr1919[11:2] are assigned to an AV section. Following the AV section, a fixed pattern (3FF 000 000 XYZ) is assigned to an EAV section.

In the multi-bit MUX[9:0] shown in FIG. 8B, parity bits are assigned to the high 2 bits from the MSB side, luminance signals Y[1] and [0] are assigned to the subsequent low 2 bits, color difference signals Cb[1] and [0] are assigned to the subsequent low 2 bits, color difference signals Cr[1] and [0] are assigned to the subsequent low 2 bits, and a reserve region ("Reserve") is assigned to the lowest 2 bits on the LSB side. Signal DPT[11:0] of depth information S22 is assigned to the reserve region.

In this example, a 2-bit reserve region occurs for every pixel in multi-bit MUX[9:0]. Thus, such a region may be assigned with depth information S22. Desired bits in signal DPT[11:0] of the depth information S22 may be independently assigned to 2 bits in the reserve region or may be assigned to multiple bits for a combination of two or more pixels (for example, 8 bits in total for 4 pixels). Thus, the depth information S22 can be superimposed on Link-B by assigning the signal DPT[11:0] of the depth information S22 in accordance with such a method of assigning bits to the reserve region.

Therefore, a luminance signal Y[11:2], an even-pixel color-difference signal Cb[11:2], and an even-pixel color-difference signal Cr[11:2] can be transmitted from the transmitter 102 to the receiver 202 through the link La.

In addition, an odd-pixel color-difference signal Cb[11:2], an odd-pixel color-difference signal Cr[11:2], a luminance signal Y[1:0], an even and odd pixels of the respective color-difference signals Cb[1:0], even and odd pixels of the respective color-difference signals Cr[1:0], and the signal DPT[11: 0] of depth information S22 can be transmitted from the transmitter 102 to the receiver 202 through the link Lb.

Therefore, in the transmission system for three-dimensional image signal 200 and the signal transmission method according to the second embodiment of the present invention, the transmitter 102 and the receiver 202 of the present embodiment can be employed when a three-dimensional image signal ST2 containing a two-dimensional image signal S12 and the depth information S22 thereof is transmitted.

Thus, one link La of the serial digital interface of dual link connection can transmit the two-dimensional image signal S12, and simultaneously the other link Lb thereof can transmit the two-dimensional image signal S12 and/or the depth information S22 thereof.

Therefore, without a decrease in gradient of the two-dimensional image S12, any dual-link signal transmission line typically used in the art may be employed to transfer a three-dimensional image signal ST2 that contains a two-dimensional image signal S12 and the depth information S22 thereof.

Furthermore, in an image display apparatus which can connect only one of the links La and Lb and only display a two-dimensional image signal S12, it becomes possible to construct a system for transmitting a three-dimensional image signal ST2, which is capable of receiving and displaying only the two-dimensional image signal S12, even in the case of receiving the three-dimensional signal ST2.

For example, there is a case that the receiver 202 includes only the input port 21 and can receive only a signal from the link La. In this case, the receiver 202 receives each of the luminance signal Y[11:2], even-pixel color-difference signal Cb-even[11:2], and even-pixel color-difference signal Cr-even[11:2], and these signals have 10-bit color information of YCbCr422 format. Therefore, the user can now view a color image based on the 10-bit two-dimensional image signal S12 of YCbCr422 format with a horizontal resolution of 1920 pixels and a vertical resolution of 1080 lines.

As described above, the signal DPT[11:0] of the depth information S22 is of a 12-bit width, for example, the most distal side is "0" and the most proximal side is "4096". However, the bit width may be no more than necessary, so that the bit width will not limited to 12 bits. For example, if a sufficient bit number for the signal DPT is 8 bits, part of the bits may be used such that 8 bits on the MSB side of the multi-bit MUX[9:0] of the high 10 bits D[19:10] of the link La may be used for assigning the depth information S22.

Third Embodiment

Third Transmission System for Three Dimensional Image Signal

Figure 9:
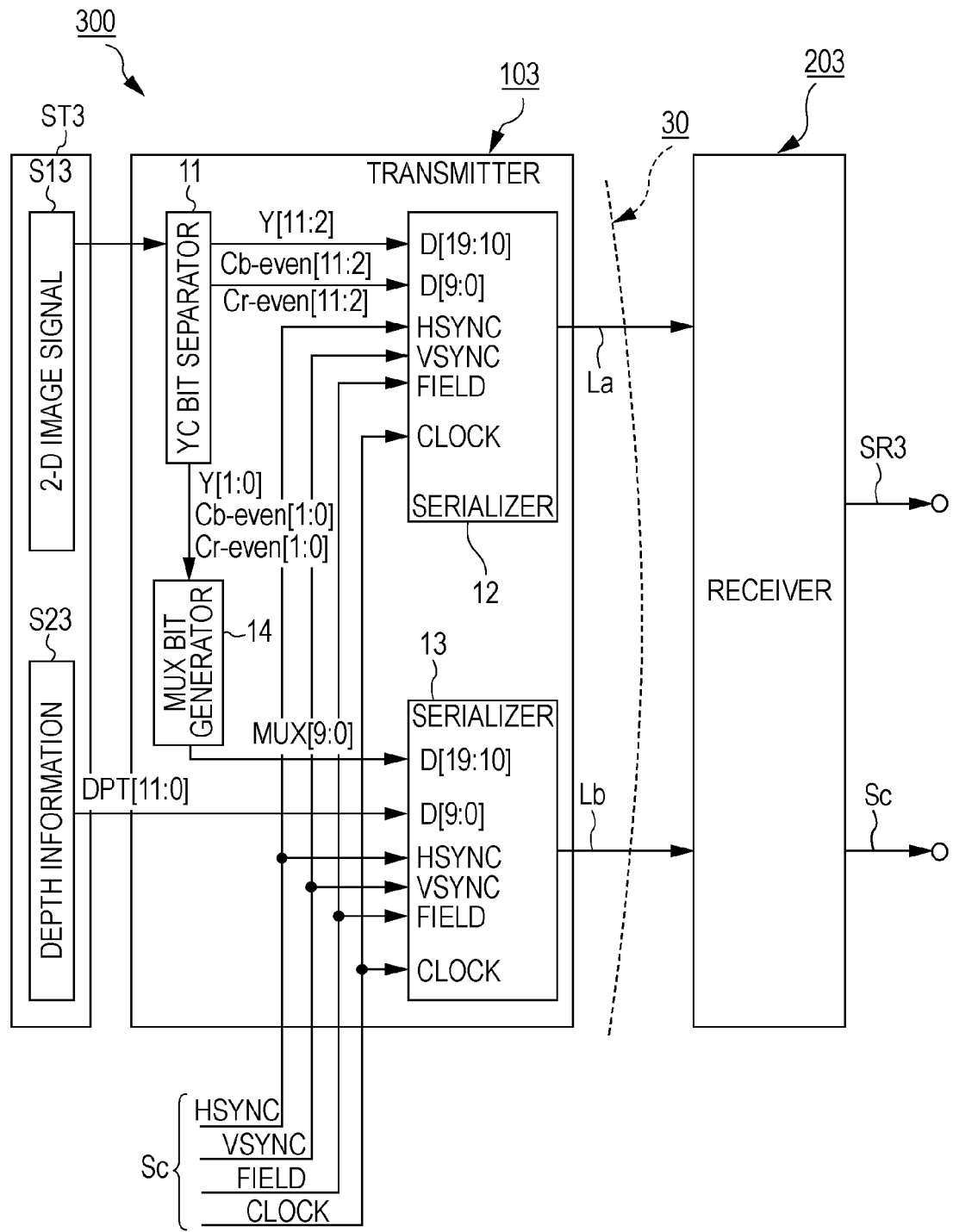
FIG. 9 is a block diagram illustrating the configuration of a transmitter in a transmission system for three dimensional image signal 300 according to a third embodiment.
Figure 10:
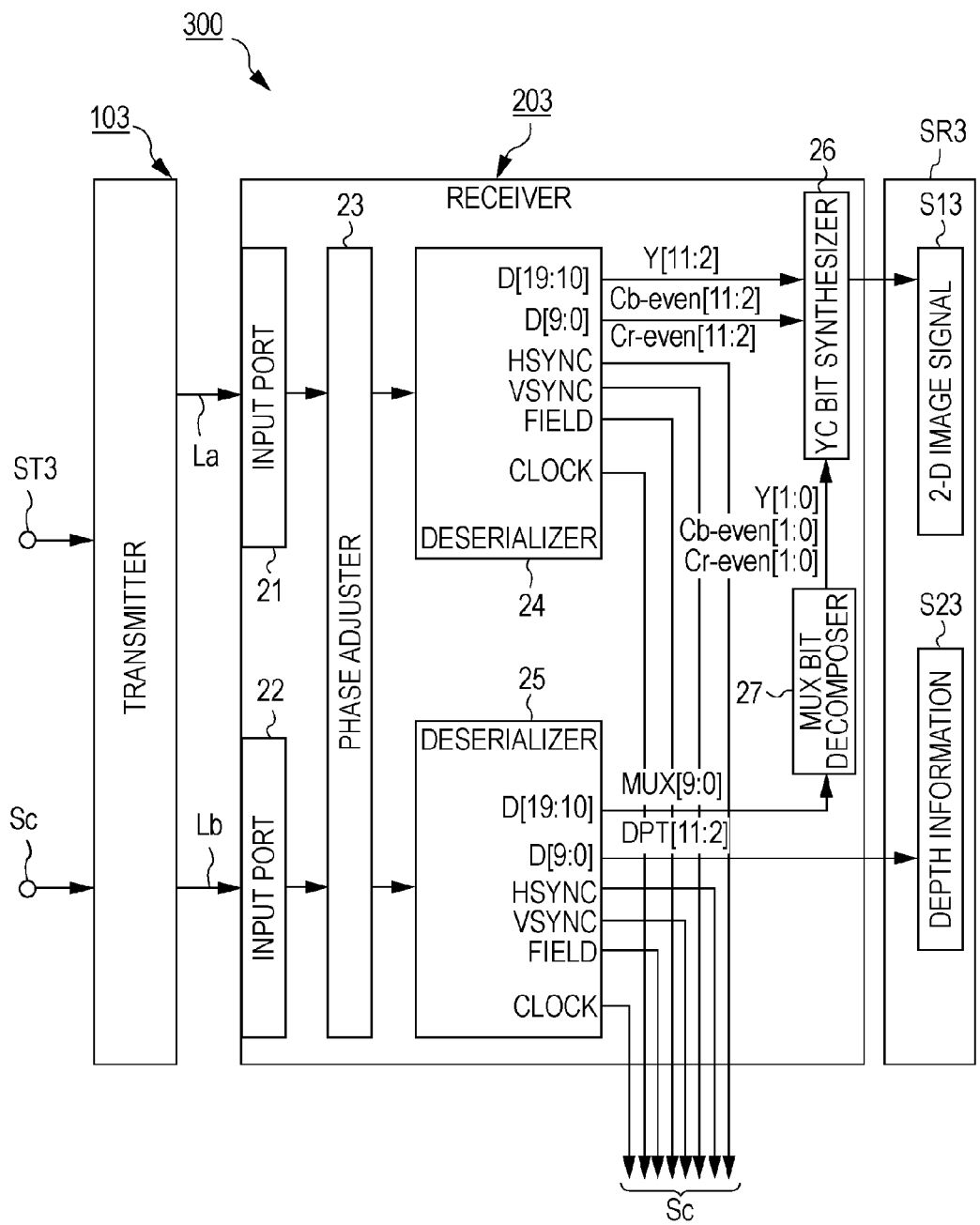
FIG. 10 is a block diagram illustrating the configuration of a receiver in the transmission system for three dimensional image signal 300 according to the third embodiment.

FIG. 9 is a block diagram illustrating the configuration of a transmitter in a transmission system for three dimensional image signal 300 according to a third embodiment of the present invention. FIG. 10 is a block diagram illustrating the configuration of a receiver in a transmission system for three dimensional image signal 300 according to a third embodiment of the present invention. The transmission system for three dimensional image signal 300 shown in FIGS. 9 and 10 constitutes an example of a signal transmission line, and transmits a three-dimensional image signal for performing a process of displaying a three-dimensional image display from a recording/reproducing apparatus or the like to an image display apparatus in a manner similar to that of the first and second embodiments.

The transmission system for three dimensional image signal 300 includes a signal transmitting unit 30, a transmitter 103, and a receiver 203. Both the transmitter 103 and the receiver 203 are connected by a signal transmitting unit 30 in a manner similar to that of the first and second embodiments. That is, the signal transmitting unit 30 includes two links La and Lb that constitute a dual-link signal transmission line. Luminance signal Y[11:0], color-difference signal Cb[11:0], color-difference signal Cr[11:0], and signal DPT[11:0] depth information S23 are assigned to the link La and link Lb.

Like the first and second embodiments, the transmitter 103 is mounted on a signal output state of a recording/reproducing apparatus and includes a YC bit separator 11, serializers 12 and 13, and MUX bit generator 14. To the receiver 203 connected to the two-line signal transmitting unit 30, the transmitter 103 transmits a three-dimensional image signal ST3 including a two-dimensional image signal S13 of a YCbCr422-format and depth information S23 about the two-dimensional image signal S13.

The two-dimensional image signal S13 of the YCbCr422 format gives a 12-bit data format corresponding to an image display apparatus with a horizontal resolution of 1920 pixels and a vertical resolution of 1080 pixels [Pixel Size: 1920× 1080, Color Space: YCbCr422 12 bits, image Format: 2D image+Depth, Format Rate: 30, 29.97, 25, 24, 23.98 progressive and Psf,: 60, 59.94 50 fields Interlace].

The depth information S23 gives a 12-bit data format corresponding to an image display apparatus with a horizontal resolution of 1920 pixels and a vertical resolution of 1080 pixels.

The YC bit separator 11 is an exemplary signal separator and receives an input of a two-dimensional image signal S13 in parallel-bit configuration supplied from a recording/reproducing apparatus or the like (not shown) and then performs YC bit separation. In this example, the numbers attached to the endings of the terms, luminance signal Y that constitutes the two-dimensional image signal S13 or the like, color-difference signal Cb and color-difference signal Cr, and signal DPT that constitutes depth information S23, represent the numbers of pixels in each line, respectively.

If the three-dimensional image signal ST3 is input into the transmitter 103, the YC bit separator 11 operates to take out each of signals from the two-dimensional image signal S13. The signals include: a luminance signal Y[11:2], an even-pixel color-difference signal Cb-even[11:2], and an even-pixel color-difference signal Cr-even[11:2]; and a luminance signal Y[1:0], an even-pixel color-difference signal Cb-even[1:0], and an even-pixel color-difference signal Cr-even[1:0].

The luminance signal Y[11:2], even-pixel color-difference signal Cb-even[11:2], and even-pixel color-difference signal Cr-even[11:2] taken out by the YC bit separator 11 are output to the serializer 12. The luminance signal Y[1:0], even-pixel color-difference signal Cb-even[1:0], and even-pixel color-difference signal Cr-even[1:0] taken out by the YC bit separator 11 are output to a MUX bit generator 14.

The MUX bit generator 14 is designed as an example of a bit generator and generates reserved bits for signal multiplexing to odd pixels or even pixels of a two-dimensional image signal S13 in parallel configuration subjected to YC bit separation by the YC bit separator 11.

Figure 12A:
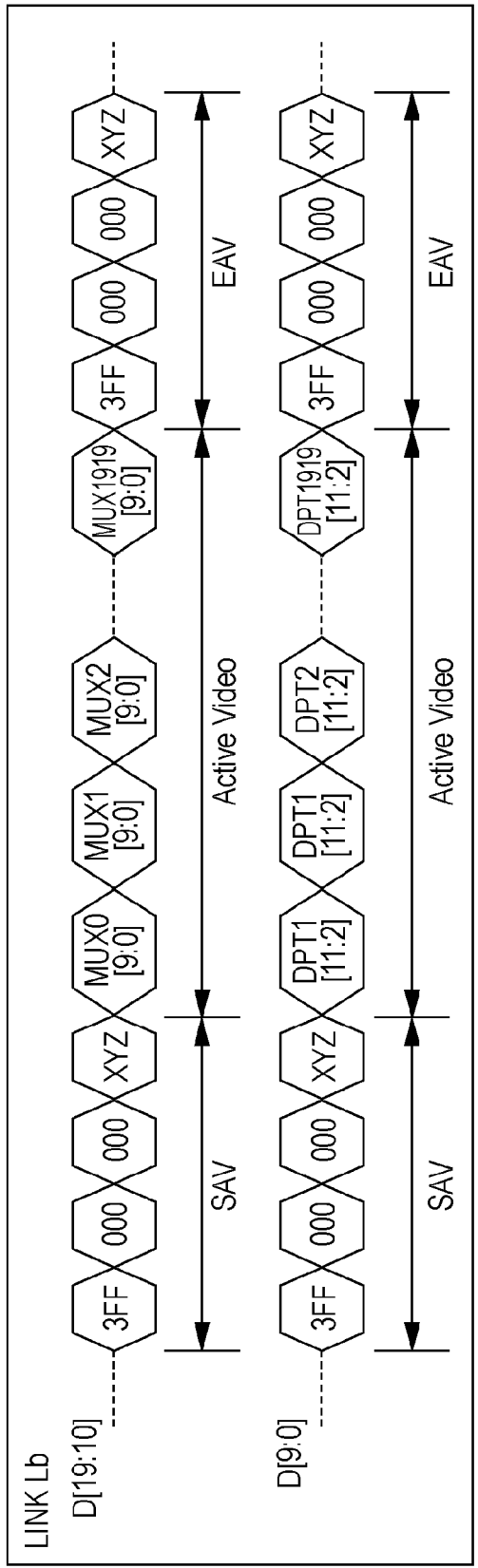
FIG. 12A is a time chart illustrating an example of serial signal transmission in the link Lb of the transmission system for three-dimensional image signal 300 (second example)
Figure 12B:
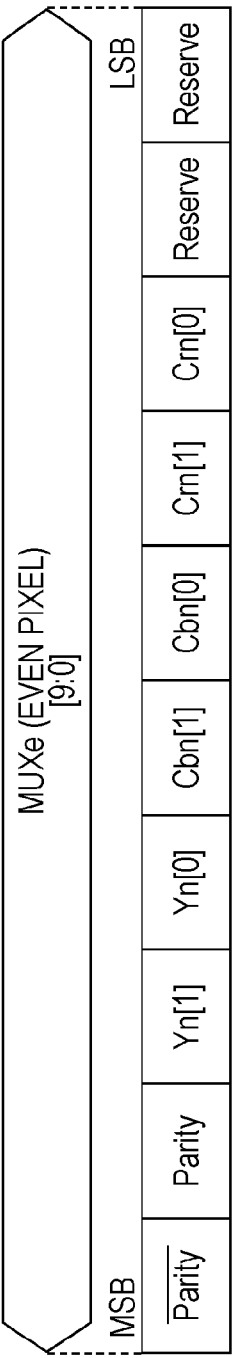
FIG. 12B is a time chart illustrating an example of serial signal transmission of even-pixel MUX[9:0]
Figure 12C:
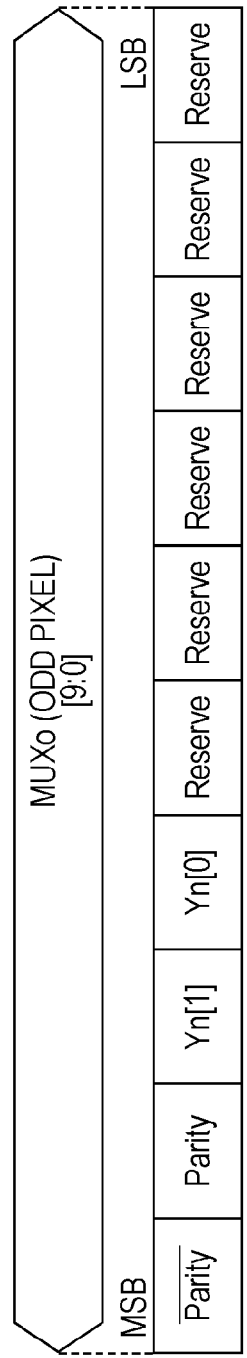
FIG. 12C is a time chart illustrating an example of serial signal transmission of odd-pixel MUX[9:0] (second example).

The MUX bit generator 14 is provided with a multi-bit MUX[9:0] in which a reserve region ("Reserve") is formed (see FIG. 12A, FIG. 12B, and FIG. 12C).

In this example, the depth information S23 is taken out from the three-dimensional image signal ST3, the depth information S23 is given by a signal DPT[11:0], and the signal DPT[11:0] of the depth information S23 is of a 12-bit width, for example, the most distal side is "0" and the most proximal side is "4096". A procedure for allowing the sender to extract the depth information S23 from the three-dimensional image signal ST3 is not typically relevant to any embodiment of the present invention and may be any of typical procedures in the art.

Both the serializer 12 and the MUX bit generator 14 are connected to the YC bit separator 11. The serializer 12 converts the two-dimensional image signal S13 in parallel-bit configuration subjected to YC-bit separation by the YC bit separator 11 into a two-dimensional image signal S13 in serial-bit configuration and then outputs the signal to the link La. The serializer 12 is designed as a serial digital interface and an output terminal thereof is connected to the link La. In this example, the luminance signal Y[11:2], even-pixel color-difference signal Cb-even[11:2], and even-pixel color-difference signal Cr-even[11:2] are assigned to the link La of the signal transmitting unit 30 (see FIG. 9).

The serializer 13 combines a two-dimensional image signal S13 in parallel-bit configuration subjected to YC bit separation with depth information S23 in parallel-bit configuration, while converting a two-dimensional image signal S13 in serial-bit configuration with depth information S23 and outputting the signal to the link Lb.

The serializer 13 is designed as a serial digital interface and the output terminal thereof is connected to the link Lb.

For example, the signal DPT[11:0] of the depth information S23 is assigned to the link Lb.

Each of the serializer 12 and the serializer 13 combines the two-dimensional signal S13 and/or depth information S23 in serial-bit configuration with, for example, a control signal Sc for controlling an electronic apparatus, such as an image display apparatus, of a transmission destination. Also in this example, control signals Sc, such as an HSYNC signal, a VSYNC signal, a FIELD signal, and a CLOCK signal, are superimposed. An HSYNC signal, a VSYNC signal, a FIELD signal, and a CLOCK signal are common by two-dimensional image signal S13 and depth information S23. The signal transmitting unit 30 may be either of a wired system or a wireless system.

In this way, according to the configuration of the transmitter 103, when the three-dimensional image signal ST3 including the two-dimensional signal S13 and the depth information S23 of the two-dimensional signal S13 is transmitted to the receiver 203 connected to the signal transmitting unit 30 having two links La and Lb, one link La of the serial digital interface of dual link connection can transmit the two-dimensional image signal S13 and the other link Lb thereof can transmit the two-dimensional image signal S13 and/or the depth information S23 thereof.

In this example, to the link La of the signal-transmitting unit 30, a luminance signal Y[11:2], an even-pixel color-difference signal Cb-even[11:2], each of even-pixel color-difference signal Cr-even[11:2], an HSYNC signal, a VSYNC signal, a FIELD signal, and a CLOCK signal are serialized and transmitted. To the link Lb, multi-bit MUX[9:0] obtained by multiplexing each of a luminance signal Y[1:0], an even-pixel color-difference signal Cb-even[1:0], an even-pixel color-difference signal Cr-even[1:0], and so on; signal DPT[11:0] of depth information S23; an HSYNC signal, a VSYNC signal, a FIELD signal, and a CLOCK signal are serialized and transmitted.

The receiver 203 shown in FIG. 10 receives a three-dimensional image signal ST3 including a two-dimensional image signal S13 and the depth information S23 of the two-dimensional image signal S13 from the transmitter 103 connected to the signal-transmitting unit 30 having two links La and Lb. The receiver 203 includes input ports 21 and 22, a phase adjuster 23, deserializers 24 and 25, a YC bit synthesizer 26, and a MUX bit decomposer 27. The three-dimensional image signal ST3 includes a two-dimensional image signal S13 and the depth information S23 of the two-dimensional image signal S13.

One end of the input port 21 is connected to the link La of the signal transmitting unit 30 and the other end thereof is connected to the phase adjuster 23, where one of two-dimensional image signals S13 subjected to YC bit separation is received from the link La. One end of the input port 22 is connected to the link Lb of the signal transmitting unit 30 and the other end thereof is connected to the phase adjuster 23, where the other of the two-dimensional image signals S13, which are combined together, and the depth information S23 thereof is received from the link Lb.

The phase adjuster 23 performs phase adjustment with respect to the two-dimensional image signal S13 in serial-bit configuration received from the link La and the two-dimensional image signal S13 in serial-bit configuration and the depth information S23 thereof received from the link Lb. For example, the phase adjuster 23 cancels a phase shift generated in each signal on the link La and the link Lb. The details of the method for canceling the phase shift is the same as one described in the first and second embodiments.

The phase adjuster 23 is connected to deserializers 24 and 25. Serial signals from the link La and Lb subjected to the phase adjustment are output from the phase adjuster 23 to the deserializers 24 and 25, respectively. In this example, the phases of the respective signals are coincided with one another and thus the bit phase shift phase is being canceled. Therefore, each of the luminance signal Y[11:2], even-pixel color-difference signal Cb-even[11:2], even-pixel color-difference signal Cr-even[11:2], signal DPT[11:0] of the depth information S23, luminance signal Y[1:0], even-pixel color-difference signal Cb-even[1:0], and even-pixel color-difference signal Cr-even[1:0] can be extracted from the serial signal.

The deserializer 24 converts a two-dimensional image signal S13 in serial configuration from the link La, which has been phase-adjusted by the phase adjuster 23, into a two-dimensional image signal S13 in parallel-bit configuration. For example, from a serial signal from the link La after the phase adjustment, the deserializer 24 extracts each of a luminance signal Y[11:2], an even-pixel color-difference signal Cb-even[11:2], and an even-pixel color-difference signal Cr-even[11:2]; and a HSYNC signal, a VSYNC signal, a FIELD signal, and a CLOCK signal and then decodes the extracted signals.

The deserializer 25 is designed as an example of a second signal processor and converts a two-dimensional image signal S13 in serial configuration from the link Lb, which has been phase-adjusted by the phase adjuster 23, and the depth information S23 thereof into a two-dimensional image signal S13 in parallel-bit configuration and the depth information S23 thereof.

For example, from a serial signal from the link Lb after the phase adjustment, the deserializer 25 extracts multi-bit MUX[9:0] obtained by multiplexing each of a luminance signal Y[1:0], an even-pixel color-difference signal Cb-even[1:0], an even-pixel color-difference signal Cr-even[1:0], and so on; and a HSYNC signal, a VSYNC signal, a FIELD signal, and a CLOCK signal and then decodes the extracted signals. A procedure for allowing the receiver 203 to extract the depth information S23 from the two-dimensional image signal S13 is not typically relevant to any embodiment of the present invention and may be any of typical procedures in the art.

The deserializer 25 is connected to the MUX bit decomposer 27 which is designed as an example of bit decomposer. The MUX bit decomposer 27 decomposes the two-dimensional image signal S13 in parallel-bit configuration output from the deserializer 25 into odd pixels and/or even pixels. For example, the MUX bit decomposer 27 decomposes the serial signal of MUX[9:0]. From the decomposed serial signals, pixels that constitute parity bits, a luminance signal Y[1:0], even-pixel color-difference signal Cb-even[1:0], even-pixel color-difference signal Cr-even[1:0], depth information S23 are extracted.

A YC bit synthesizer 26 is designed as an example of a signal compositing part and connected to both the deserializer 24 and the MUX bit decomposer 27. The YC bit synthesizer 26 performs YC bit synthesis of two-dimensional image signal S13 in parallel-bit configuration output from the deserializer 24 and the two-dimensional image signal S13 in parallel-bit configuration output from the MUX bit decomposer 27.

For example, the YC bit synthesizer 26 performs bit synthesis of each of the luminance signal Y[11:2], even-pixel color-difference signal Cb-even[11:2], and even-pixel color-difference signal Cr-even[11:2]; and the luminance signal Y[1:0], even-pixel color-difference signal Cb-even[1:0], and even-pixel color-difference signal Cr-even[1:0]. As a result, the original luminance signal Y[11:0], color-difference signal Cb[11:0], and color-difference signal Cr[11:0] are restored.

This restoration leads to generate a two dimensional image signal S13 from the luminance signal Y[11:0], color-difference signal Cb[11:0], and color-difference signal Cr[11:0] and depth information S23 from the signal DPT[11:0]. Therefore, a three-dimensional image based on the three-dimensional image signal SR3 can be displayed.

When the receiver 203 can display a three-dimensional image signal SR3, both the two-dimensional image signal S13 and the depth information S23 can be received as described above, allowing a user to view a three dimensional image signal SR3.

Each of FIG. 11, and FIGS. 12A to 12C is a time chart illustrating first and second examples of transmission of serial signals through Link-A and Link-B of a transmission system for three dimensional image signal 300, respectively.

In the diagram, a horizontal axis is a time and each hexagon on the horizontal axis represents a data packet. Also in this example, a three-dimensional image signal ST3 is represented by 20 bits (D[19:0]). To the link La of the signal-transmitting unit 30 shown in FIG. 9 and FIG. 10, a luminance signal Y[11:2], an even-pixel color-difference signal Cb[11:2], and an even-pixel color-difference signal Cr[11:2] are assigned.

Figure 11:
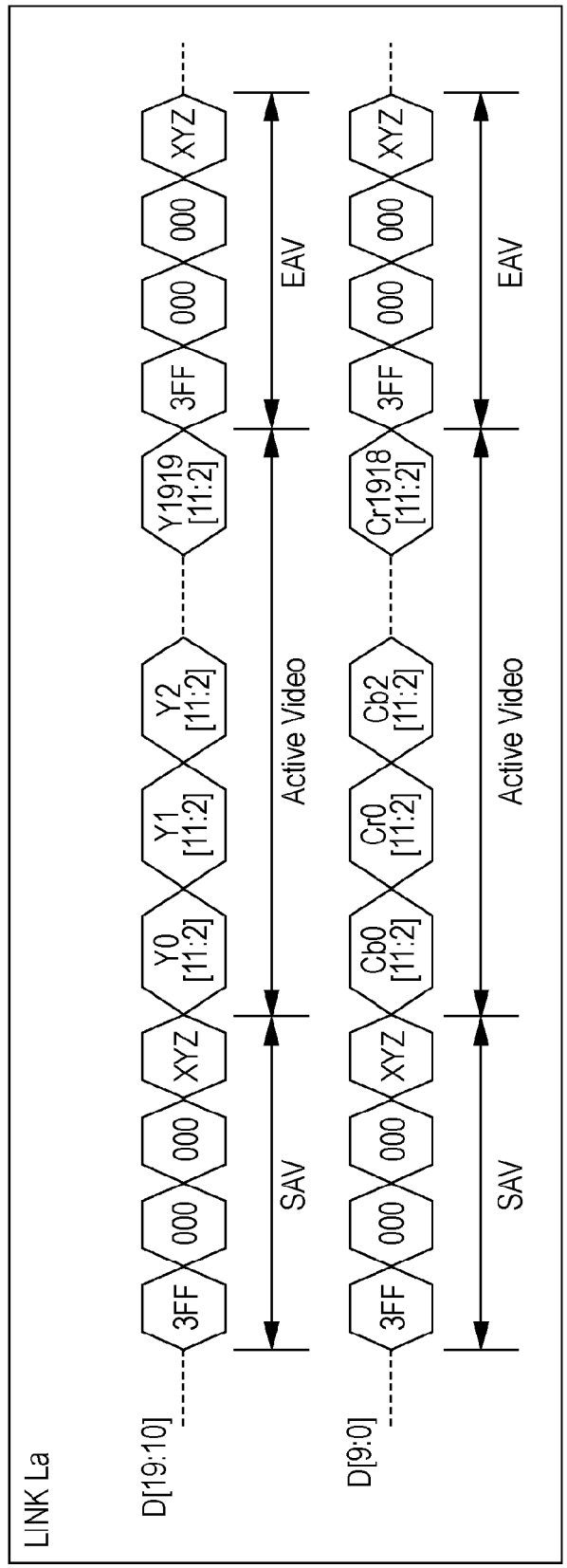
FIG. 11 is a time chart illustrating an example of serial signal transmission in the link La of the transmission system for three-dimensional image signal 300 (first example)

According to the link La shown in FIG. 11, a fixed pattern (3FF 000 000 XYZ) is assigned as a SAV section to the high 10 bits (D[19:10]) of the serial signal. The SAV section is followed by an AV section to which luminance signals Y0[11:2], Y1[11:2], Y2[11:2], . . . , and Y1919[11:2] are assigned. Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. Following the SAV section, even-pixel color-difference signals Cb0[11:2], Cr0[11:2], Cb2[11:2], . . . , and Cr1918[11:2] are assigned to an AV section. Following the AV section, a fixed pattern (3FF 000 000 XYZ) is assigned to an EAV section.

According to the link Lb shown in FIG. 12A, like the La, a fixed pattern (3FF 000 000 XYZ) is assigned as a SAV section to the high 10 bits (D[19:10]) of the serial signal. Here, if multi-bit is set to MUX[9:0], the SAV section is followed by an AV section to which the multi-bit MUX0[9:0], MUX1[9:0], and MUX2[9:0], . . . , MUX1919[9:0] are assigned as multiplexed bits that constitute luminance signals Y, color-difference signals Cb, color-difference signals Cr, and other signals. Following the AV section, a fixed pattern (3FF 000 000 XYZ) is assigned to an EAV section.

Furthermore, a fixed pattern (3FF 000 000 XYZ) is assigned as a SAV section to the low 10 bits (D[9:0]) of the serial signal. The SAV section is followed by an AV section to which signals DPT0[11:2], DPT1[11:2], DPT2[11:2], . . . , and DPT1919[11:2] of depth information S23 are assigned. Following the AV section, a fixed pattern (3FF 000 000 XYZ) is assigned to an EAV section.

Multi-bit MUXe[9:0] shown in FIG. 12B is extracted from FIG. 12A. Parity bits are assigned to the high 2 bits on the MSB side, luminance signals Y[1] and [0] are assigned to the subsequent low 2 bits, even-pixel color-difference signals Cb[1] and [0] are assigned to the further subsequent low 2 bits, even-pixel color-difference signals Cr[1] and [0] are assigned to the further subsequent low 2 bits, and a reserve region ("Reserve") is assigned to the lowest 2 bits on the LSB side. In this example, the multi-bit MUXe[9:0] represents each of even pixels.

Multi-bit MUXo[9:0] shown in FIG. 12C is also extracted from FIG. 12A. Parity bits are assigned to the high 2 bits on the MSB side, luminance signals Y[1] and [0] are assigned to the subsequent low 2 bits, and a reserve region ("Reserve") is assigned to the subsequent low 6 bits. In this example, the multi-bit MUXo[9:0] represents each of odd pixels. To the above reserve region, for example, some bits of signal DPT[11:0] of the depth information S23, a control signal Sc, and so on are assigned.

In this example, a two-bit reserve region is generated for every even pixel in the multi-bit MUX[9:0]. Thus, some bits of the signal DPT[11:0] of the depth information S23, the control signal Sc, and so on can be assigned to such a portion. In addition, a 6-bit reserve region is generated for every odd pixel. Thus, some bits of the signal DPT[11:0] of the depth information S23, the control signal Sc, and so on can be assigned to such a portion.

Consequently, the transmission of signals from the transmitter 103 to the receiver 203 through the link La can be performed. That is, a luminance signal Y[11:2], an even-pixel color-difference signal Cb[11:2], and an even-pixel color-difference signal Cr[11:2] are transmitted. In addition, the transmission of signals from the transmitter 103 to the receiver 203 through the link Lb can be also performed. That is, a luminance signal Y[1:0], an even-pixel color-difference signal Cb[1:0], an even-pixel color-difference signal Cr[1:0], and a signal DPT[11:0] of depth information S23 can be transmitted.

Therefore, in the transmission system for three-dimensional image signal 300 and the signal transmission method according to the third embodiment of the present invention, the transmitter 103 and the receiver 203 of the present embodiment can be employed when a three-dimensional image signal ST3 containing a two-dimensional image signal S13 and the depth information S23 thereof is transmitted. Thus, one link La of the serial digital interface of dual link connection can transmit the two-dimensional image signal S13, and simultaneously the other link Lb thereof can transmit the two-dimensional image signal S13 and/or the depth information S23 thereof.

Therefore, without a decrease in gradient of the two-dimensional image S13, any dual-link signal transmission line typically used in the art may be employed to transfer a three-dimensional image signal ST3 that contains a two-dimensional image signal S13 and the depth information S23 thereof.

Furthermore, in an image display apparatus which can connect only one link La and only display a two-dimensional image signal S13, it becomes possible to construct a system for transmitting a three-dimensional image signal ST3, which is capable of receiving and displaying only the two-dimensional image signal S13, even in the case of receiving the three-dimensional signal ST3.

For example, when the receiver 203 includes only the input port 21 and can receive only a signal from the link La, in this case, the receiver 203 receives each of the luminance signal Y[11:2], even-pixel color-difference signal Cb-even[11:2], and even-pixel color-difference signal Cr-even[11:2], and these signals have 10-bit color information of YCbCr422 format. Therefore, a user can now view a color image based on the 10-bit two-dimensional image signal S13 of YCbCr422 format with a horizontal resolution of 1920 pixels and a vertical resolution of 1080 lines.

As described above, the signal DPT[11:0] of the depth information S23 is of a 12-bit width, for example, the most distal side is represented by "0" and the most proximal side is represented by "4096". However, the bit width may be no more than necessary, so that the bit width will not limited to 12 bits. For example, just as in the case of the present example, when only a 10-bit signal DPT[11:2] is used for the depth information S23, signal DPT[11:2] may be assigned to data D[9:0] of the serializer 13. Furthermore, if a sufficient bit width of signal DPT is 8 bits, only 8 bits of the data D[11:2] on the MSB side may be used. In contrast, if a 12-bit width is necessary, another technique in which MUXe[1:0] or the like is used in addition to D[11:2].

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A transmitter, comprising:
   a signal separator that performs YC bit separation of a two-dimensional image signal in parallel-bit configuration,
      wherein when a three-dimensional image signal including said two-dimensional image signal and depth information of said two-dimensional image signal is transmitted to a receiver using two signal transmission lines, said three-dimensional image signal including said two-dimensional image signal and said depth information of said two-dimensional image signal, one signal-separated part of said two-dimensional image signal is transmitted to a first signal transmission line, and the other signal-separated part of said two-dimensional image signal is combined with said depth information and then transmitted to a second signal transmission line;
   a first signal processor that converts said two-dimensional image signal in parallel-bit configuration subjected to YC bit separation by said signal separator into a two-dimensional image signal in serial-bit configuration and outputs said two-dimensional image signal in serial-bit configuration to said first signal transmission line; and
   a second signal processor that converts said two-dimensional image signal in parallel-bit configuration after said YC bit separation and depth information in parallel-bit configuration into a two-dimensional image signal and depth information in serial-bit configuration, combines said two-dimensional image signal in serial-bit configuration and said depth information in serial-bit configuration, and outputs a combined signal.

2. The transmitter according to claim 1, wherein
   said first signal processor combines said two-dimensional image signal in serial-bit configuration with a control signal for controlling said two-dimensional image signal, and
   said second signal processor combines said two-dimensional image signal and depth information with a control signal for controlling a receiving electronic apparatus.

3. A transmitter, comprising:
   a signal separator that performs YC bit separation of a two-dimensional image signal in parallel-bit configuration,
      wherein when a three-dimensional image signal including said two-dimensional image signal and depth information of said two-dimensional image signal is transmitted to a receiver using two signal transmission lines, said three-dimensional image signal including said two-dimensional image signal and said depth information of said two-dimensional image signal, one signal-separated part of said two-dimensional image signal is transmitted to a first signal transmission line, and the other signal-separated part of said two-dimensional image signal is combined with said depth information and then transmitted to a second signal transmission line; and
   a bit generator that combines said two-dimensional image signal in parallel-bit configuration subjected to YC bit separation by said signal separator with depth information of said two-dimensional image signal.

4. The transmitter according to claim 3, wherein
   said bit generator generates a reserved bit for signal multiplexing to an odd pixel and/or an even pixel of said two-dimensional image signal in parallel configuration subjected to YC bit separation by said signal separator.

5. A receiver, comprising:
   a phase adjuster;
      wherein when a three-dimensional image signal including a two-dimensional image signal and depth information of said two-dimensional image signal is received from a transmitter using two signal transmission lines, one signal-separated part of said two-dimensional image signal from a first signal-transmission line is received and the other of said two-dimensional image signal and depth information, which are combined together, are received from a second signal transmission line,
      wherein said two-dimensional image signal and said depth information received from said second signal transmission line are separated from each other,
      wherein said two-dimensional image signal received from said first signal transmission line and said two-dimensional image signal received from said second signal transmission line are combined together,
      wherein a three-dimensional signal including said combined second two-dimensional image signals and said separated depth information is output, and
      wherein the phase adjuster adjusts a phase of said two-dimensional image signal in serial-bit configuration received from said first signal transmission line to a phase of said two-dimensional image signal and depth information in serial-bit configuration received from said second signal transmission line,
   a first signal processor that converts said two-dimensional image signal in serial-bit configuration from said first signal transmission line and phase-adjusted by said phase adjuster into a two-dimensional image signal in parallel-bit configuration; and
   a second signal processor that converts said two-dimensional image signal and depth information in serial-bit configuration from said second signal transmission line and phase-adjusted by said phase adjuster into a two-dimensional image signal and depth information in parallel-bit configuration.

6. The receiver according to claim 5, further comprising:
a signal synthesizer that performs YC bit synthesis between said two-dimensional image signal in parallel configuration output from said first signal processor and said second dimensional image signal in parallel-bit configuration output from said second signal processor.

7. The receiver according to claim 6, further comprising:
a bit decomposer that perform signal decomposition of said two-dimensional image signal and depth information in parallel-bit configuration output from said second signal processor from each other.

8. The receiver according to claim 7, wherein
said bit decomposer decomposes said two-dimensional image signal in parallel-bit configuration output from said second signal processor into an odd pixel and/or an even pixel.

9. A signal transmission system, comprising:
a transmitter that receives an input of a three-dimensional image signal including a two-dimensional image signal and depth information of said two-dimensional image signal, performs signal separation of said two-dimensional image signal, transmits one signal-separated part of said two-dimensional image signal to a first signal transmission line, and combines the other signal-separated part of said two-dimensional image signal with said depth information and transmitted to a second signal transmission line;
a receiver that receives one signal-separated part of said two-dimensional image signal from said first signal-transmission line, receives the other of said two-dimensional image signal and depth information, which are combined together, from said second signal transmission line, separates said two-dimensional image signal and said depth information received from said second signal transmission line from each other, and combines said two-dimensional image signal received from said first signal transmission line with said two-dimensional image signal received from said second signal transmission line, and outputs a three-dimensional signal including said combined second two-dimensional image signals and said separated depth information; and
two signal transmission lines that connect said transmitter and said receiver,
wherein the receiver further comprises:
a phase adjuster that adjusts a phase of said two-dimensional image signal in serial-bit configuration received from said first signal transmission line to a phase of said two-dimensional image signal and depth information in serial-bit configuration received from said second signal transmission line;
a first signal processor that converts said two-dimensional image signal in serial-bit configuration from said first signal transmission line and phase-adjusted by said phase adjuster into a two-dimensional image signal in parallel-bit configuration; and
a second signal processor that converts said two-dimensional image signal and depth information in serial-bit configuration from said second signal transmission line and phase-adjusted by said phase adjuster into a two-dimensional image signal and depth information in parallel-bit configuration.

10. A method for signal transmission, comprising:
allowing a system for transmitting a three-dimensional image signal to receive an input of a three-dimensional image signal including a two-dimensional image signal and depth information of said two-dimensional image signal and perform signal separation of said two-dimensional image signal;
transmitting one signal-separated part of said two-dimensional image signal to a first signal transmission line and combining the other signal-separated part of said two-dimensional image signal with said depth information and then transmitted to a second signal transmission line;
receiving one signal-separated part of said two-dimensional image signal from said first signal-transmission line and
receiving the other of said two-dimensional image signal and depth information, which are combined together, from said second signal transmission line;
separating said two-dimensional image signal and said depth information received from said second signal transmission line from each other;
combining said two-dimensional image signal received from said first signal transmission line and said two-dimensional image signal received from said second signal transmission line;
outputting a three-dimensional image signal including said compounded two-dimensional image signal and said separated depth information;
adjusting a phase of said two-dimensional image signal in serial-bit configuration received from said first signal transmission line to a phase of said two-dimensional image signal and depth information in serial-bit configuration received from said second signal transmission line;
converting said two-dimensional image signal in serial-bit configuration from said first signal transmission line and phase-adjusted into a two-dimensional image signal in parallel-bit configuration; and
converting said two-dimensional image signal and depth information in serial-bit configuration from said second signal transmission line and phase-adjusted into a two-dimensional image signal and depth information in parallel-bit configuration.

* * * * *